US010564802B2

(12) United States Patent
Rose et al.

(10) Patent No.: US 10,564,802 B2
(45) Date of Patent: Feb. 18, 2020

(54) GRAPHICAL USER INTERFACES FOR RESOURCE CONSUMPTION ANALYTICS

(71) Applicant: APANA INC., Bellingham, WA (US)

(72) Inventors: Matthew W. Rose, Bellingham, WA (US); Frank Burns, Spokane, WA (US); Tom Remmers, Seattle, WA (US); Matt Maher Peterson, Bellingham, WA (US)

(73) Assignee: APANA Inc., Bellingham, WA (US)

( * ) Notice: Subject to any disclaimer, the term of this patent is extended or adjusted under 35 U.S.C. 154(b) by 578 days.

(21) Appl. No.: 14/923,233

(22) Filed: Oct. 26, 2015

(65) Prior Publication Data

US 2016/0117070 A1     Apr. 28, 2016

Related U.S. Application Data

(60) Provisional application No. 62/069,820, filed on Oct. 28, 2014, provisional application No. 62/238,651, filed on Oct. 7, 2015.

(51) Int. Cl.
*G06F 3/0481*     (2013.01)
*G06Q 50/06*     (2012.01)
(Continued)

(52) U.S. Cl.
CPC ......... *G06F 3/04817* (2013.01); *G01D 4/004* (2013.01); *G06F 3/0484* (2013.01);
(Continued)

(58) Field of Classification Search
CPC .. G06F 3/0484; G06F 3/04817; G06F 17/241; G06Q 50/06; G06T 11/206
See application file for complete search history.

(56) References Cited

U.S. PATENT DOCUMENTS

| 4,843,575 A | 6/1989 | Crane |
| 6,963,808 B1 | 11/2005 | Addink et al. |

(Continued)

FOREIGN PATENT DOCUMENTS

| JP | 2003256967 | 9/2003 |
| JP | 2007183890 | 7/2007 |

(Continued)

OTHER PUBLICATIONS

Canadian Office Action dated Dec. 4, 2017 for Canadian patent application No. 2965674, a counterpart foreign application of U.S. Appl. No. 14/923,161, 6 pages.

(Continued)

*Primary Examiner* — Eric J. Bycer
(74) *Attorney, Agent, or Firm* — Lee & Hayes, P.C.

(57) ABSTRACT

The systems and methods described herein are directed to graphical user interfaces presenting resource consumption analytics. Resource usage is provided in a graphical user interface indicating current resource consumption and/or historical resource consumption. Weather data and a cumulative running total can be provided along with the resource consumption data to clearly provide a deep understanding of resource usage and operating conditions. Further, resource consumption information from multiple monitoring locations may be juxtaposed and/or presented simultaneously to provide an indication of outlying usage consumption among similarly situated monitoring locations. The graphical user interfaces may be provided with alerts, alarms, thereby reporting and alerting to an end-user via multiple delivery mechanisms, of potential sources of resource waste or loss. Further, the alerts or alarms can include easily interpreted recommendations to allow a non-skilled worker to take corrective procedures to maximize efficient use of the consumable resources.

11 Claims, 17 Drawing Sheets

(51) Int. Cl.
*G01D 4/00* (2006.01)
*G06F 3/0484* (2013.01)
*G06F 17/24* (2006.01)
*G06T 11/20* (2006.01)

(52) U.S. Cl.
CPC ........... *G06F 17/241* (2013.01); *G06Q 50/06* (2013.01); *G06T 11/206* (2013.01); *G06T 2200/24* (2013.01); *Y02B 90/242* (2013.01); *Y02B 90/245* (2013.01); *Y04S 20/322* (2013.01); *Y04S 20/38* (2013.01); *Y04S 20/40* (2013.01)

(56) References Cited

U.S. PATENT DOCUMENTS

| | | | |
|---|---|---|---|
| 7,966,099 B2 | 6/2011 | Fima | |
| 8,336,352 B2* | 12/2012 | Abiprojo | H02H 3/50 324/102 |
| 8,347,427 B2 | 1/2013 | Klicpera | |
| 8,489,342 B2 | 7/2013 | Dugger et al. | |
| 8,571,922 B2 | 10/2013 | Zaloom | |
| 8,618,941 B2 | 12/2013 | Javey et al. | |
| 8,706,650 B2 | 4/2014 | Ozog | |
| 8,818,758 B1* | 8/2014 | Singh | G06F 21/81 702/182 |
| 2004/0044493 A1* | 3/2004 | Coulthard | G06Q 10/10 702/122 |
| 2006/0009928 A1 | 1/2006 | Addink et al. | |
| 2007/0198679 A1* | 8/2007 | Duyanovich | G06F 11/3409 709/223 |
| 2007/0257806 A1* | 11/2007 | Madden | G01N 33/18 340/603 |
| 2008/0224892 A1 | 9/2008 | Bogolea et al. | |
| 2008/0228325 A1 | 9/2008 | Schindler | |
| 2010/0145629 A1 | 6/2010 | Botich et al. | |
| 2010/0283606 A1 | 11/2010 | Tsypin et al. | |
| 2010/0289652 A1 | 11/2010 | Javey et al. | |
| 2011/0137827 A1* | 6/2011 | Mason, Sr. | G06Q 10/06 705/413 |
| 2011/0215945 A1* | 9/2011 | Peleg | G01M 3/2807 340/870.02 |
| 2011/0303310 A1 | 12/2011 | Klicpera | |
| 2012/0026004 A1 | 2/2012 | Broniak et al. | |
| 2013/0144546 A1 | 6/2013 | Brackney et al. | |
| 2013/0179096 A1 | 7/2013 | Stevens et al. | |
| 2013/0199272 A1 | 8/2013 | Khalifa et al. | |
| 2013/0274899 A1* | 10/2013 | Hamzaoui | G05B 23/0281 700/81 |
| 2016/0116303 A1 | 4/2016 | Rose et al. | |

FOREIGN PATENT DOCUMENTS

| | | |
|---|---|---|
| JP | 2009130593 | 6/2009 |
| JP | 2010204943 | 9/2010 |

OTHER PUBLICATIONS

Israeli Office Action dated Sep. 27, 2017 for Israeli patent application No. 251558, a counterpart foreign application of U.S. Appl. No. 14/923,161, 4 pgs.

PCT Search Report and Written Opinion dated Apr. 6, 2016 for PCT Application No. PCT/US15/57588, 18 pages.

Canadian Office Action dated May 23, 2017 for Canadian patent application No. 2965674, a counterpart foreign application of U.S. Appl. No. 14/923,161, 3 pages.

Translated Japanese Office Action dated Oct. 17, 2017 for Japanese Patent Application No. 2017-534771, a counterpart foreign application of U.S. Appl. No. 14/923,161, 12 pages.

Office action for U.S. Appl. No. 14/923,161, dated Oct. 6, 2017, Rose, "Systems and Methods for Resource Consumption Analytics", 15 pages.

Partial Supplementary European Search Report dated Jul. 26, 2018 for European patent application No. 15854113.6, 13 pages.

Office Action for U.S. Appl. No. 14/923,161, dated Oct. 1, 2018, Rose et al, "Systems and Methods for Resource Consumption Analytics", 13 pages.

Office Action for U.S. Appl. No. 14/923,161, dated Jun. 4, 2018, Rose et al, "Systems and Methods for Resource Consumption Analytics", 13 pages.

Extended European Search Report dated Oct. 26, 2018 for European Application No. 15854113.6, 11 pages.

Canadian Office Action dated Jul. 27, 2018 for Canadian patent application No. 2965674, a counterpart foreign application of U.S. Appl. No. 14/923,161, 7 pages.

* cited by examiner

REGIONAL WATER USAGE FOR A PLURALITY OF LOCATIONS

Company #1 Demo Water Consumption

Date

WHS# Carwash

Yesterday (gal)    00:00 to 06:00    Yesterday
                   Today              09:00 to 15:00

Region

| Region | | Yesterday (gal) | | |
|---|---|---|---|---|
| | District 1 | | 1002 | 1004 |
| 0462 | Location #1 — 1006 | 8,580 | | |
| 452 | Location #2 | 10,649 | | |
| 0121 | Location #3 — 1008 | 62 | | |
| 0469 | Location #4 — 1010 | 13,725 | | |
| 0488 | Location #5 | 7,523 | | |
| 0401 | Location #6 | 6,708 | | |
| 1775 | Location #7 Carwash | 29,376 | | |
| 0775 | Location #7 Warehouse | 7,767 | | |
| 0460 | Location #8 | 7,073 | | |
| 1080 | Location #9 | 7,989 | | |
| 1080 | Location #10 Compartment Sink | 135 | | |
| 1080 | Location #11 Compartment Sink | 891 | | |

FIG. 10

WASTE EVENT MESSAGE GENERATOR FOR A PLURALITY OF LOCATIONS

Home   Sites   Utilities   Rebate   Reports   Status   Logout

Water Waste Events

| Date | Site | Node | Class | Type | Auto | Status | # Events | Level | Durations | Action |
|---|---|---|---|---|---|---|---|---|---|---|
| 2015-09-24 | Location #1 | | Triage | Operational | Stop | Open | | | | |
| 2015-09-24 | Location #1 | Backage | Manual ← 1202 | Operational | Stop | Open | | | | |
| 2015-09-24 | Location #2 | Backage | Triage | Operational | Stop | Open | | | | |
| 2015-09-24 | Location #3 | Backage | Manual | Operational | Stop | Open | | | | |
| 2015-09-24 | Location #4 | Cooling Tower | Manual | Operational | Stop | Open | | | | |
| 2015-09-24 | Location #5 | Cooling Tower | Triage ← 1204 | Operational | Stop | Open | | | | |
| 2015-09-24 | Location #6 | Bags | Triage | Operational | Stop | Open | | | | |
| 2015-09-24 | Location #7 | Bags | Triage | Operational | Stop | Open | | | | |
| 2015-09-24 | Location #8 | Warehouse Ideas | Triage | Operational | Stop | Open | | | | |
| 2015-09-24 | Location #9 | Warehouse Operations | Triage | Operational | Stop | Open | | | | |
| 2015-09-24 | Location #10 | Warehouse Operations | Triage | Operational | Bypass | Open | | | | |
| 2015-09-24 | Location #10 | | Triage | Operational | Stop | Open | | | | |
| 2015-09-23 | Location #10 | Backage | Triage | Operational | Stop | Open | | | | |
| 2015-09-23 | Location #11 | Combined ← 1206 | Auto | Operational | Stop | Open | | | | |
| 2015-09-23 | Location #11 | Cooling Tower | Triage | Operational | Stop | Open | | | | |
| 2015-09-23 | Location #12 | Cooling Tower 1 | Triage | Operational | Stop | Open | | | | |
| 2015-09-23 | Location #13 | Bags | Triage | Operational | Stop | Open | | | | |
| 2015-09-23 | Location #14 | Bags | Triage | Operational | Stop | Open | | | | |

GRAPHICAL USER INTERFACES FOR RESOURCE CONSUMPTION ANALYTICS

CROSS REFERENCE TO RELATED APPLICATIONS

This patent application claims priority filing benefit from U.S. Provisional Patent Application Nos. 62/069,820, filed Oct. 28, 2014, and 62/238,651, filed Oct. 7, 2015, each of which are hereby incorporated by reference, in their entirety.

BACKGROUND

Resource consumption is a growing concern in the design and maintenance of commercial and residential uses. Resources continue to increase in price and decrease in availability, which in turn has led to increased interest in efficient use and conservation thereof to reduce costs and decrease the environmental footprint. Degradation in capital combined with unknown minor uses resulting in small reductions in efficiency can result in costly, large amounts of excess resources being consumed. Consequently, the need for methods of increased resource efficiency has driven commercial and residential consumers to embrace resource audits, monitoring systems, and expensive retrofitting to reduce resource consumption. Resource audits are costly and provide a onetime analysis of resource use. Additionally, these human-based audits suffer from substantial variability in interpretation of data and the quality of resource savings. Resource monitoring systems provide a continual, automated, and impartial method of resource consumption.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 10 shows a GUI illustrating regional water usage for a plurality of locations.

FIG. 12 shows a GUI illustrating a waste event message generator for a plurality of locations.

FIG. 15 shows GUI illustrating a water bill manager for a user location.

DETAILED DESCRIPTION

Figure 1:
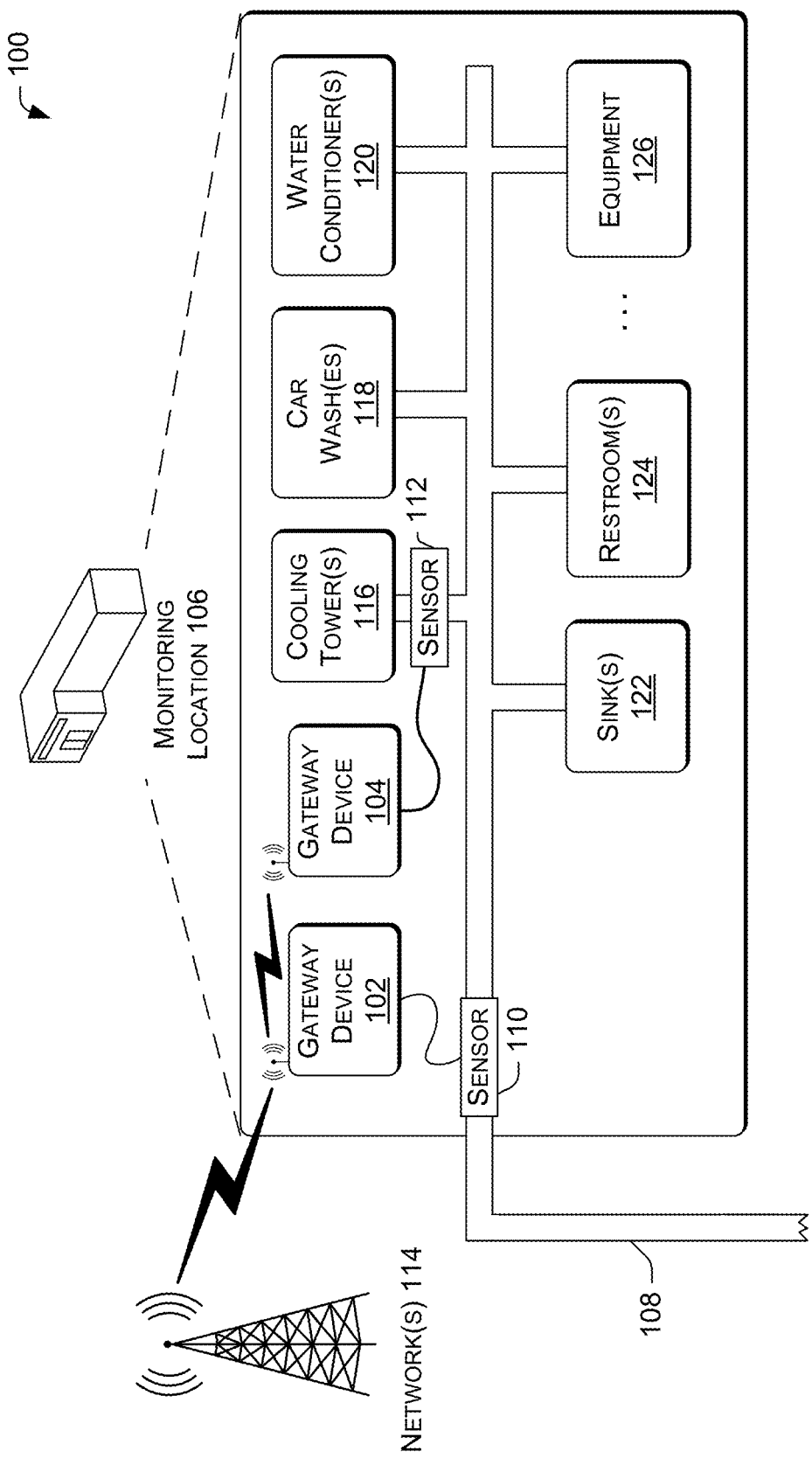
FIG. 1 illustrates an example environment including a gateway device monitoring resources at a monitoring location.

Embodiments of the present invention are directed to resource usage data and providing resource consumption analytics. The methods and systems relate to resource monitoring and analytics systems enabling more efficient use of resources with automated detection with directed action to frontline personnel. More particularly, the present invention relates to real-time or near real-time resource monitoring via remote sensors that transmit the information to a central service provider. The information is processed and displayed into a graphical user interface designed to interpret the raw data into simple recommendations capable of being executed upon by unskilled workers. The embodiments offer the ability for an unskilled user to take conservation action based upon complicated data without the need for specialized training. The embodiments also offer full integration of sensors, telemetry, networks, databases, analytical software, algorithm development, and reporting, using open source tools and standardized hardware. By providing an integrated package and solution, simple retrofit is possible within an existing infrastructure.

In an embodiment, the disclosure includes a system in which one or more remote sensors continually monitors and communicates by sending information packets to a centralized processing unit, such as a gateway device. The information packets are then compiled, compressed, and sent to a secured remote storage based system via a wired connection or other common wireless methods such as a local area network (LAN), wide area network (WAN), cellular network and/or satellite enabling the remote processing of information. In some embodiments, the systems and methods described herein continually cross-reference historical use information with present use information and/or with site specific data such as weather or site events to identify potential sources of resource savings.

The system can be comprised of one or more computer-implemented modules with a plurality of components. Each component can correspond to a particular configuration of remote sensors designed to monitor and provide operational data for the desired subsection of a business or monitoring location. Each component can consist of a plurality of subcomponents whereby each subcomponent is configured to monitor a particular resource, e.g. water, electricity, gas, air, etc., or a particular use of a particular resource, e.g., water use in lavatories. The computer-implemented modules compile and analyze the data from the plurality of components. A resource consumption analytics algorithm can accurately interpret excessive use or consumption of resources for a particular component, and can provide suggested courses of actions to the endpoint graphical user interface presented on a user's computing device.

The resource consumption analytics can be provided to a user in a graphical interface via transmission directly to the responsible user via mobile technology or over commonly used wired or wireless communication protocols. As mentioned above, telemetry data can be collected at a monitoring location or site and transmitted to a service provider, whereby the data is analyzed to determine actionable information for an end user or facility decision makers to take immediate remedial action on the data provided via the graphical interface. Upon discovering an abnormal event or data, the system triggers a response and notice that delivers data and recommendations to prevent the over usage of resources when said abnormality is occurring and/or while the event is still operationally relevant. Actionable information can include, but is not limited to, alarms, alerts, reports, and/or recommendations for changing management infrastructure and/or design criteria. Immediate savings in resources are realized and operational changes can be made upon delivery of the data and remedial instructions.

In various embodiments, the techniques and/or systems described herein can improve a functioning of devices by reducing an amount of resources consumed or wasted by mechanical or operational waste sources. For example, by monitoring, tracking, and/or providing analytics of resource consumption data, recommendations can be applied to reduce waste and improve operational efficiency, thereby saving resources. The reports and/or alerts provided in the graphical user interfaces can be applied directly or indirectly to equipment, machinery, and/or standard operating procedures to reduce resource usage. Thus, the systems and methods improve equipment operation, save resources, and reduce operating expenses, among other benefits.

FIG. 1 illustrates an example environment 100 including one or more gateway devices (e.g., gateway devices 102 and 104) monitoring resources at a monitoring location 106, in accordance with embodiments of the disclosure.

In some embodiments, the monitoring location 106 can represent a warehouse, grocery store, restaurant, car wash, office building, residence, oil refinery, or any location that uses one or more resources, such as resource 108. As can be understood in the context of this disclosure, the resource 108 can include one or more resources such as water, electricity, air, fuel (gasoline, diesel, kerosene, etc.), or the like, and in some embodiments, can include inputs and/or outputs to and from the monitoring location 106. For example, the resource 108 can represent clean or potable water and/or waste water.

The monitoring location 106 can include one or more gateway devices 102 and 104, which are operatively coupled with one or more sensors 110 and 112. As illustrated in FIG. 1, the sensor 110 provides input to the gateway device 102, while the sensor 112 provides input to the gateway device 104. In some embodiments, the gateway device 104 can wirelessly communicate with the gateway device 102, which in turn can wirelessly communicate with network(s) 114. In some embodiments, the gateway device 104 can communicate directly with the network(s) 114. In some embodiments, the gateway devices 102 and 104 can form a mesh network, with the gateway device 102 providing a communication interface with the network(s) 114. In some embodiments, the gateway devices 102 and 104 can communicate with the network(s) 114 via channels not provided on a network or communication means provided by the monitoring location 106. That is to say, the gateway devices 102 and 104 can communicate with the network(s) 114 independently from the monitoring location 106 to reduce network congestion and to improve network security. In some embodiments, the gateway devices 102 and 104 can communicate with the network(s) 114 via any wired or wireless connections. The gateway devices 102 and 104 are also discussed in connection with FIG. 2, below.

The monitoring location 106 can include, but is not limited to, one or more cooling tower(s) 116, car wash(es) 118, water conditioner(s) 120, sink(s) 122, restroom(s) 124, and/or equipment 126, such as heaters, computers, televisions, mobile phones, lights, pumps, buildings, irrigation, electrical, gas, HVAC, programmable logic controllers, sensors, etc. As can be understood in the context of this disclosure, the monitoring location 106 can represent any type of business, government, industrial, institutional, school, hospital, land scape, agricultural, and/or residential facility, and can include any associated equipment 126. Furthermore, the monitoring location 106, can include additional sensors for monitoring or measuring an occupancy of the monitoring location 106, environmental sensors for monitoring or measuring temperature, humidity, or weather at the monitoring location 106, and/or a security system at the monitoring location.

In some embodiments, one or more sensors 110 and 112 can be used to monitor resources consumed at the monitoring location 106. For example, each piece of equipment can be associated with a unique sensor, while in some embodiments, only one sensor can be used, to monitor a water main or electrical main, for example. In some embodiments, multiple types of resources can be monitored at the monitoring location, such as water and electricity consumption. In some embodiments, data from multiple sensors can be combined and/or analyzed together to generate a virtual node with an associated resource consumption. For example, telemetry data from the cooling tower(s) 116 provided by the sensor 112 can be used to remove the effect of the cooling tower(s) 116 on the resource consumption monitored by the sensor 110. In some embodiments, multiple sensors can be used to increase a resolution of data provided by the systems and methods described herein. In some embodiments, data from multiple sensors may be determined and correlated to provide insight into operations at the monitoring location 106. For example, the occupancy of the monitoring location 106 may be determined along with water and/or electricity usage to determine operational and/or mechanical waste and/or to determine when a resource consumption is within operating procedures.

Figure 2:
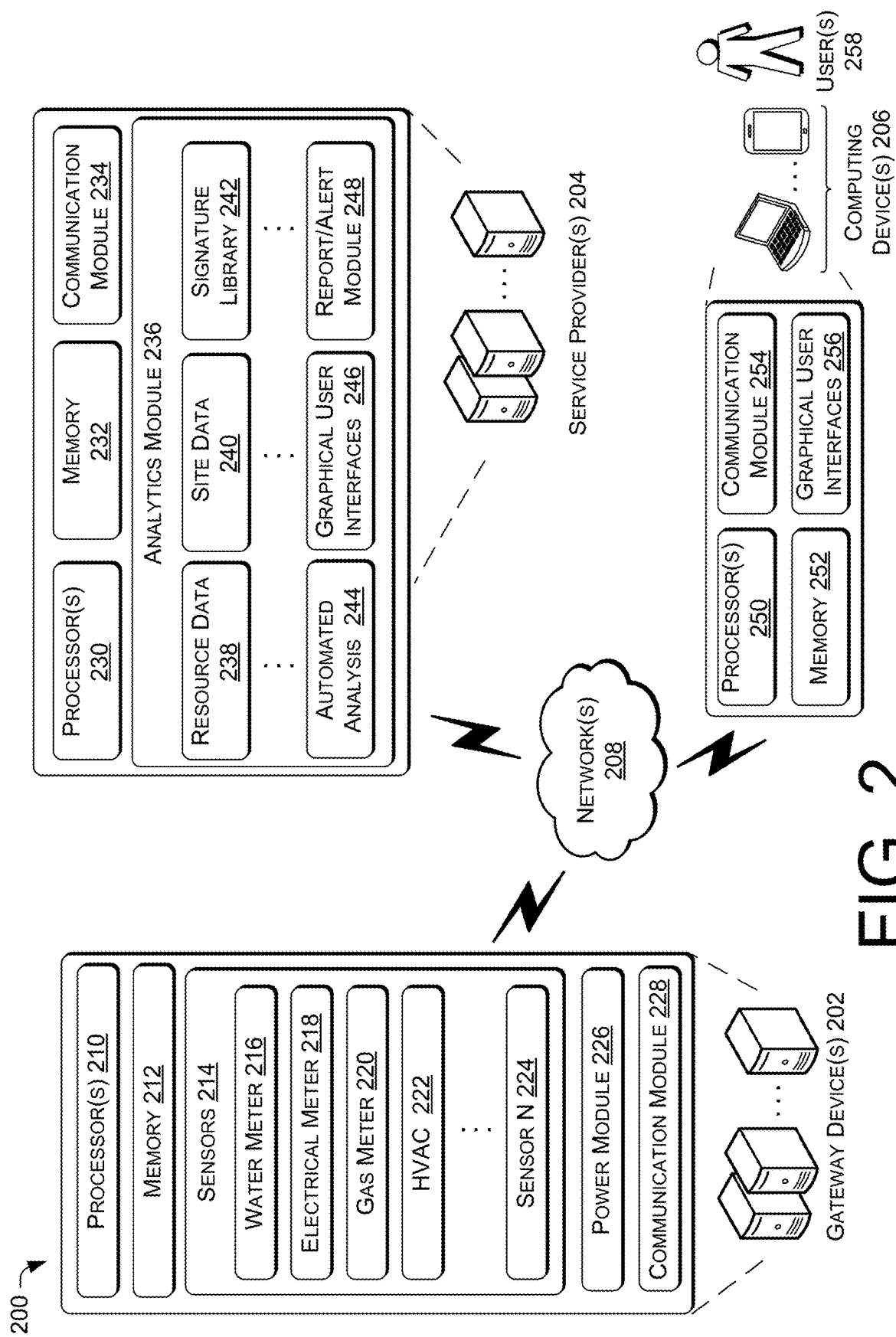
FIG. 2 illustrates an example environment including gateway device(s), service provider(s), and computing device(s), for monitoring resources and providing resource consumption analytics.

FIG. 2 illustrates an example environment 200 that is usable to implement the techniques and systems described herein. The environment 200 includes a plurality of devices such as gateway device(s) 202 configured to gather and process data described herein. The environment 200 also includes one or more service provider(s) 204 that can further provide processing and analytics. The service provider 204 is configured to communicate alerts, reports, analytics, recommendations, instructions, graphical user interfaces, etc., to the computing device(s) 206. In various examples, the gateway device 202, the service provider 204, and the computing device 206 can communicate wired or wirelessly via one or more networks 208.

The gateway device(s) 202 can individually include, but are not limited to, any one of a variety of devices, including portable devices or stationary devices. For instance, a device can comprise a data logger, an embedded system, a programmable logic controller, a sensor, a monitoring device, a smart phone, a mobile phone, a personal digital assistant (PDA), a laptop computer, a desktop computer, a tablet computer, a portable computer, a server computer, a wearable device, or any other electronic device. In various embodiments, the gateway device 202 can correspond to the gateway devices 102 and 104 of FIG. 1.

The gateway device 202 can include one or more processor(s) 210 and memory 212. The processor(s) 210 can be a single processing unit or a number of units, each of which could include multiple different processing units. The processor(s) 210 can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), pulse counters, resistor/coil readers, other logic circuitry, a system on chip (SoC), and/or any other devices that perform operations based on instructions. Among other capabilities, the processor(s) 210 can be configured to fetch and execute computer-readable instructions stored in the memory.

The memory 212 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PRAM), Static Random-Access Memory (SRAM), Dynamic Random-Access Memory (DRAM), other types of Random-Access Memory (RAM), Read Only Memory (ROM), Electrically Erasable Programmable ROM (EEPROM), flash memory or other memory technology, Compact Disk ROM (CD-ROM), Digital Versatile Disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 212 can include an operating system configured to manage hardware and services within and coupled to a device for the benefit of other modules, components and devices. In some embodiments, the one or more gateway device(s) 202 can include one or more servers or other computing devices that operate within a network service (e.g., a cloud service), or can form a mesh network, etc. The network(s) 208 can include the Internet, a Mobile Telephone Network (MTN), Wi-Fi, a cellular network, a mesh network, a Local Area Network (LAN), a Wide Area Network (WAN), a Virtual LAN (VLAN), a private network, and/or other various wired or wireless communication technologies. In some embodiments, the network(s) 208 can correspond to the network(s) 114 of FIG. 1.

The techniques discussed above can be implemented in hardware, software, or a combination thereof. In the context of software, operations represent computer-executable instructions stored on one or more computer-readable storage media that, when executed by one or more processors, configure a device to perform the recited operations. Generally, computer-executable instructions include routines, programs, objects, components, data structures, and the like that perform particular functions or implement particular abstract data types.

The gateway device 202 can include one or more sensors 214, including but not limited to, a water meter 216 (e.g., in-line or ultrasonic), an electrical meter 218, a gas meter 210, a heating, ventilation, and air conditioning (HVAC) sensor/monitor 222, and/or sensor N 224. The sensors 214 can continuously or periodically monitor data at any interval, or upon request. In some embodiments, the gateway device 202 can include one or more expansion ports (e.g., as sensor N 214) to receive additional sensors or input from additional monitoring systems, such as individual appliances or "smart" devices. In some embodiments, the gateway device 202 may monitor lighting, building occupancy, building security, environmental factors (e.g., indoor/outdoor weather, temperature, wind, sun, rain, etc.), or the like. In some embodiments, the sensors 214 receive one or more pulses or data from a sensor integrated with a plant utility, such as a water sensor in-line with a water main in a building. In some embodiments, one or more inputs and/or sensors 214 can be optically isolated to protect the gateway device 202 from receiving damaging inputs. In some embodiments, and without limitation, the sensors 214 can receive any inputs in the range of 4-20 milliamps (mA). In some embodiments, the gateway device 202 can timestamp each pulse or input received by the sensors 214. That is to say, each data point monitored, received, and/or transmitted by the gateway device 202 can have an associated timestamp for the generation time of the data.

The gateway device 202 can also include a power module 226 that receives power from a network such as a power grid, and can also include one or more uninterruptable power supplies (UPS) to power the gateway device 202 when power is interrupted. For example, the power module 226 can include a timer that determines a duration of time when power is absent and can shut down the gateway device 202 when the duration is beyond a threshold, without crashing, damaging, or losing data of the gateway device 202. Further, the power module 226 can monitor a power supply while the gateway device 202 is in a powered-down state and can restart the device when power is restored. In some embodiments, the power module 226 can send an error message when a power outage is detected. In some embodiments, the power module 226 can include one or more power filters to filter an incoming power supply to reduce a number of spurious or false counts received and/or generated by the sensors 214.

The gateway devices 202 can include a communication module 228 to communicate with other gateway devices (e.g., in mesh network) and/or to communicate via the network(s) 208. For example, the communication module 228 can perform compression, encryption, and/or formatting of the data received and/or generated by the sensors 214. In some embodiments, the communication module 228 can transmit data using one or more protocols or languages, such as an extensible markup language (XML), Modbus, HTTP, HTTPS, USB, etc.

The service provider 204 can include one or more processor(s) 230, a memory 232, and a communication module 234, each of which can be implemented similar to the processor(s) 210, the memory 212, and/or the communication module 228 of the gateway device 202.

In some embodiments, the service provider 204 can include an analytics module 236, including one or modules such as a resource data 238 module, a site data 240 module, a signature library 242, an automated analysis 244 module, a graphical user interfaces 246 module, and/or a report/alert module 248.

The analytics module 236 can receive input regarding resource usage from the gateway device 202 and can analyze the data to generate and store the resource data 238. In some embodiments, the resource data 238 can include past resource data for one or more locations, similar locations (i.e., similarly situated stores, schools, warehouses, and the like), types of equipment, etc. In some embodiments, the resource data 238 can include resource data for a plurality of resources, such as water, electricity, gas, etc.

In some embodiments, the site data 240 module can receive site-specific data relating to the monitoring location, such as occupancy data, security system data, weather (temperature, wind, daytime, nighttime, rain, etc.), information about standard operating procedures, production information associated with a site (e.g., sales, amount of product produced, shipped, etc.), scheduling information (e.g., information about holidays, local customs, traditions, trend information, etc.), or the like. Generally, the site data 240 can include any data associated with the inputs and/or outputs associated with a monitoring location.

The analytics module 236 can receive the resource data 238 and the site data 240 to determine a suspected event. In some embodiments, the analytics module 236 can compare current and/or historical resource and site data at a single location, or between a plurality of locations. In some embodiments, the analytics module 236 can correlate the resource data 238 and the site data 240 to determine one or more signatures to be stored in the signature library 242. In some embodiments, the analytics module 236 can generate one or more signatures indicating a resource usage, such as a correct or incorrect resource usage. In some embodiments, the analytics module 236 can determine mechanical and/or operational waste. In some embodiments, the analytics module 236 can generate one or more reports, alerts, recommendations, and/or graphical user interfaces. The operations of the analytics module 236 are described in connection with the various figures of this disclosure.

As described herein, a mechanical waste may result from a mechanical failure of a component, mechanism, or equipment using a particular resource. For example, a leaky faucet or valve leaking one gallon of water per minute that is not repaired corresponds to 500,000 gallons per year. In some embodiments, an operational waste is caused by human behavior. For example, cleaning a warehouse floor with a water hose is an operational waste. Mechanical waste and operational waste may occur at any time and at any interval, frequency, or regularity.

In some embodiments, the report/alert module 248 may provide reports and/or alerts to a user in real-time, near real-time, or in an operationally relevant manner. For example, a report/alert may be provided to a user detailing a consumption of a resource, and/or detailing a suspected event on the day or week following the resource use or suspected event. In some embodiments, the operationally relevant time period may provide information to a user or party allowing that user or party to act on the information or adjust a standard operating procedure to mitigate waste, for example.

The computing device 206 can include one or more processor(s) 250, a memory 252, and a communication module 254, each of which can be implemented similar to the processor(s) 210, the memory 212, and/or the communication module 228 of the gateway device 202. Further, the computing device 206 can include graphical user interfaces 256 to display or otherwise present graphical user interfaces at the computing device 206.

The environment 200 also includes one or more users 258 to employ the computing device 206. The one or more users 258 can interact with the computing device 206 to perform a variety of operations. In some embodiments, the users 258 may receive the reports/alerts generated by the service provider 204 and implement any recommended changes to equipment and/or a standard operating procedure to reduce mechanical and/or operational waste.

Figure 3A:
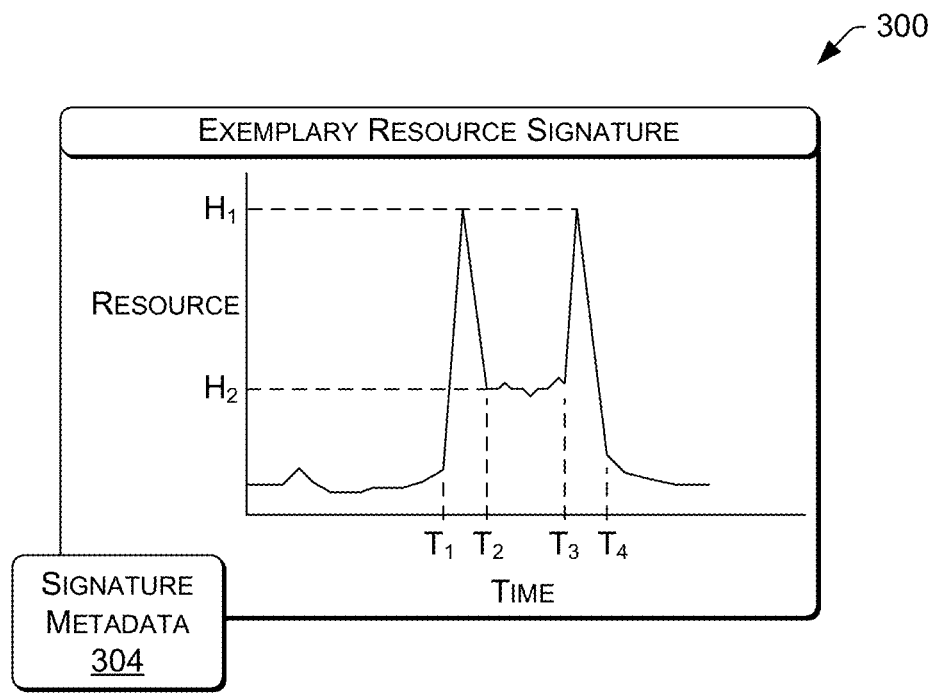
FIG. 3A illustrates a graphic representation of an exemplary resource signature.
Figure 3B:
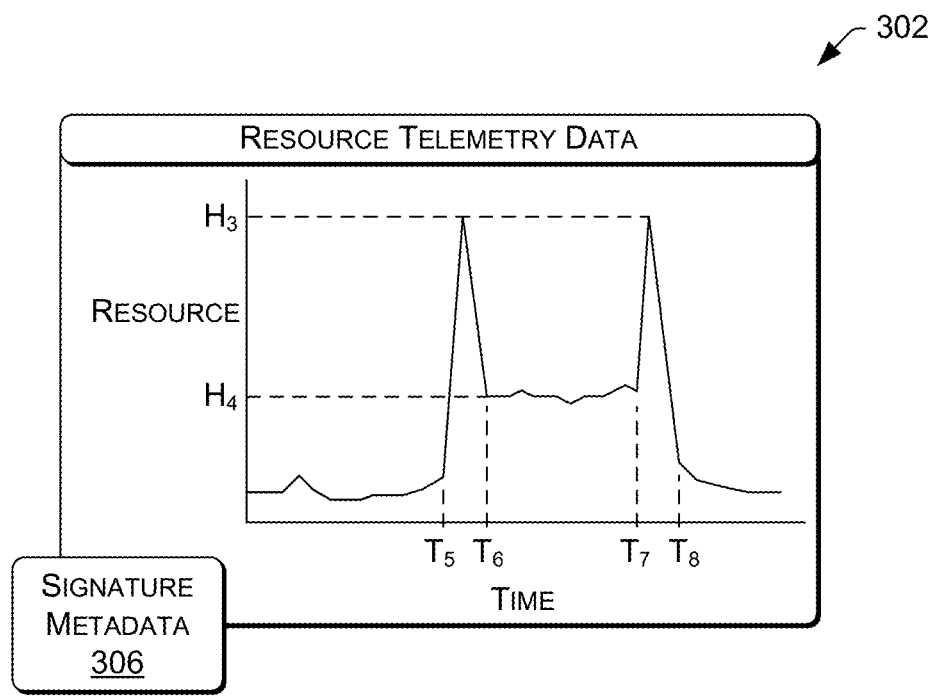
FIG. 3B illustrates a graphic representation of resource telemetry data representing a resource consumption.

FIG. 3A illustrates a graphic representation of an exemplary resource signature 300, and FIG. 3B illustrates a graphic representation of telemetry data 302 representing a resource consumption, in accordance with embodiments of the disclosure. In some embodiments, the exemplary resource signature 300 can represent a signature in a signature library (such as the signature library 242 of FIG. 2), while the telemetry data 302 can represent real-time, near real-time, and/or historical data received from the gateway device 202, for example.

In some embodiments, the exemplary resource signature 300 can be generated in accordance with the systems and methods described herein, and can represent an ideal resource consumption profile of an individual piece of equipment, such as the water conditioner 120 of FIG. 1. For example, the exemplary resource signature 300 can represent amount of water consumed by the water conditioner 120, such as a water softener, during a maintenance cycle. By way of example, the maintenance procedure can begin at $T_1$ by flooding the water conditioner 120 to backflush the water softener. This backflush occurs from $T_1$-$T_2$ (reaching a height $H_1$, corresponding to a maximum flow rate of gallons per minute, for example), after which the maintenance procedure enters a steady state between $T_2$-$T_3$ (reaching a steady state flow of height Hz, corresponding to a steady state flow rate of gallons per minute, for example). In some embodiments, the maintenance procedure in the steady state includes the addition of salts and other chemicals to the water conditioner. Finally, at time $T_3$-$T_4$, the water conditioner 120 is backflushed again, and the procedure ends. The generation of the exemplary resource signature 300 is also described below in connection with FIGS. 4A and 4B.

In some embodiments, the telemetry data 302 can represent real-time, near real-time, and/or historical telemetry data received from the gateway device 202. In some embodiments, the telemetry data 302 can represent resource consumption data received from a data store. By way of illustration, the telemetry data 302 represents a consumption profile of the water conditioner 120 during a maintenance cycle. An initial backflush is performed at time $T_5$-$T_6$ (reaching a height $H_3$, corresponding to a maximum flow rate of gallons per minute, for example), a steady state maintenance procedure is performed at time $T_6$-$T_7$ (at a steady state flow of height $H_4$, corresponding to a steady state flow rate of gallons per minute, for example), and a second backflush is performed from time $T_7$-$T_8$. While the general shape of the telemetry data 302 is roughly equivalent to the exemplary resource signature 300, it is apparent that the time period between $T_6$-$T_7$ in FIG. 3B is larger than the time period between $T_2$-$T_3$ in the exemplary resource signature 300 in FIG. 3A. Because of the differences in the area under the curve (AUC) and/or the differences in the duration of the maintenance procedure, for example, the telemetry data 302 can indicate an operational waste or mechanical waste associated with the water conditioner 120.

The exemplary resource signature 300 and/or the telemetry data 302 can be characterized in any number of ways. For example, the signatures can include an associated maximum height (e.g., $H_1$ and $H_3$, representing a maximum instantaneous resource per time, such as gallons per minute), average height, height during a steady state (e.g., $H_2$ and $H_4$), area under the curve (AUC), cumulative total, duration, frequency (e.g., daily frequency), time since last occurrence (e.g., an operation is performed at least every 30 days), volume of flow since last occurrence, and the like. In some embodiments, the signatures can include an associated expected start and stop time (time of day), a building occupancy, a lighting state, a security system state, etc. That is to say, the signatures can include information or metadata quantifying an ideal or real-time resource consumption, or the ideal or real-time conditions of the monitoring location where the resource is to be consumed.

For example, the exemplary resource signature 300 can be associated with signature metadata 304, while the resource telemetry data 302 can be associated with signature metadata 306. In general, the signature metadata 304 and 306, respectively, can indicate any operating conditions present at the monitoring location at the time of the resource consumption. In addition to the characterization information described above, for example, the signature metadata 304 and 306 may include, but is not limited to: occupancy data, security system data, weather (temperature, wind, daytime, nighttime, rain, etc.), information about standard operating procedures (e.g., frequency, duration, volume, regularity, etc.), production information associated with a site (e.g., sales, amount of product produced, shipped, etc.), scheduling information (e.g., information about holidays, local customs, traditions, trend information, etc.), or the like.

The example processes (e.g., in FIGS. 4A, 4B, and 5) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

Figure 4A:
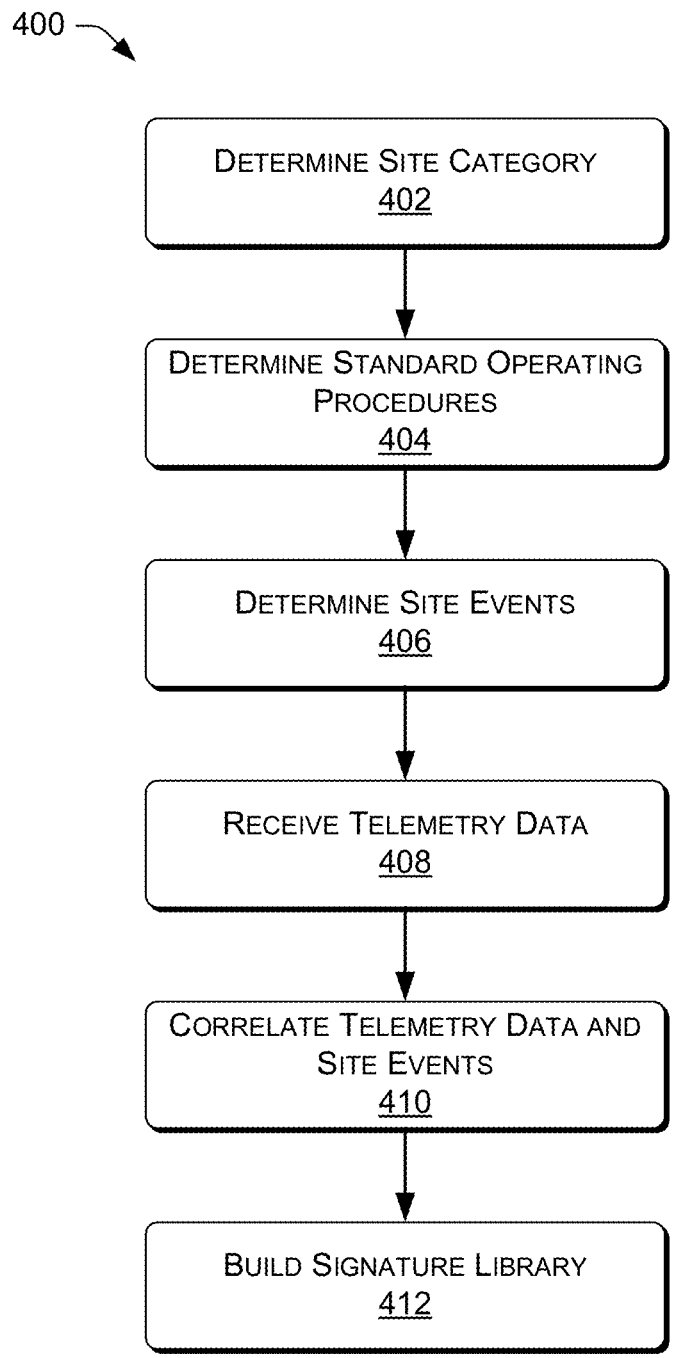
FIG. 4A illustrates an example process for building a signature library.

FIG. 4A illustrates an example process 400 for building a signature library, in accordance with embodiments of the disclosure. By way of example, the process 400 can be performed by the gateway device 202 and/or the service provider 204 in FIG. 2. Generally, the process 400 is performed to link real-world events with telemetry data received from the gateway devices in order to build a resource consumption signature that can be used in other processes to identify one or more resource consumption patterns and to determine when resource consumption is normal or abnormal (e.g., involving mechanical and/or operational waste). In some embodiments, a signature may be generated to indicate a resource waste, while in some embodiments, a signature may be generated to indicate nominal operation.

At 402, the operation determines a site category. In some embodiments, the site category can include a general identification or classification of a customer site, such as a warehouse, car wash, restaurant, grocery store, oil refinery, etc. In some embodiments, the site category can include more specific identification of equipment present and/or in operation at the site, such as the type and number of cooling towers, water conditioners, toilets, sinks, showers, etc. In some embodiments, the operation 402 can include determining a resource requirement for each piece of equipment. In some embodiments, the operation 402 can determine the characteristics (e.g., water and/or electrical resource requirements) for each piece of the site mechanisms and equipment.

At 404, the operation determines a standard operating procedure (SOP) associated with the site category and/or each piece of equipment determined in operation 402. Using the water conditioner maintenance procedure described in connection with FIGS. 3A and 3B, operation 404 can include determining how a piece of equipment can be operated, such as the backflushing states, the steady states, etc. In another example involving a car wash, operation 404 can include determining the amount of water and/or electricity used to wash one or more vehicles. In another example involving irrigation, operation 404 can include determining that a user irrigates a plot of land twice a week, for two hours at a time. In another example involving a warehouse, operation 404 can include determining that an optimal indoor operating temperature for the warehouse is 70 degrees Fahrenheit, determining that the warehouse operating hours are between 7:00 AM and 7:00 PM, and determining that the warehouse is closed on weekends. It is understood in the context of this disclosure that these examples are illustrative only and are not intended to be limiting. That is to say, the operation 404 including determining the standard operating procedure for the site can include any description, instructions, or documentation to achieve uniformity of a specific function, or any documentation or determination of processes associated with a site location.

At 406, the operation determines site events. For example, this operation can include determining usage patterns, weather conditions, scheduling conditions, and/or infrequent or irregular events that can affect the consumption of resources. For example, using the water conditioner example described in connection with FIGS. 3A and 3B, the operation 406 can include determining when the water conditioner maintenance procedure occurs. In an example involving a car wash, operation 406 can include determining when a car wash begins and ends. In an example involving a cooling tower, the operation 406 can include determining an ambient temperature during operation. In some embodiments, the operation 406 can include receiving an indication from a site that an event begins. In some embodiments, the indication can be automatically generated upon commencing an action (e.g., when a car begins a car wash) and in some embodiments, the operation 406 can include push or pull notifications from a scheduler scheduling events.

In some embodiments, operations 402, 404, and/or 406 can include receiving inputs at a graphical user interface (GUI) presented on a display. For example, the service provider 204 can present a GUI to an administrator, engineer, user, and/or customer to allow that operator to input information. For example, the GUI can present a series of question or drop-down menus collect information and build a profile of the site location. In some embodiments, a GUI can include an exemplary calendar or scheduling module that allows site events to be indicated and tracked.

At 408, the operation receives resource data. For example, the operation 408 can include receiving telemetry data from a gateway device, such as the gateway devices described in connection with FIGS. 1 and 2. In water conditioner example described in connection with FIGS. 3A and 3B, this operation can include receiving water consumption information (e.g., gallons per minute) at a time in which a maintenance procedure is occurring. In some embodiments, the telemetry data may be received from a data store, having been previously collected and/or generated.

At 410, the operation correlates the telemetry data (received in operation 408) with the site events (determined in operation 406). For example, in the water conditioner maintenance example described in connection with FIGS. 3A and 3B, the operation 410 can include receiving telemetry data indicating a water usage and correlating the telemetry data with the site event that a maintenance procedure was initiated.

Further, the operation 410 may include correlating operating and/or environmental conditions at a monitoring location with a resource usage. In an example involving a cooling tower, a resource consumption at a first ambient temperature may be different than a resource consumption at a second ambient temperature. That is to say, in this example, a cooling tower may use more resources at a high temperature than when operating in a low temperature environment. In this example, therefore, correlating the ambient temperature and resource consumption provides insight into the equipment operation and whether the equipment is operating with a mechanical and/or operational waste. By way of another example, the operation 410 may correlate resource consumption at a warehouse with a number of workers at that location. In some embodiments, the operation 410 can include determining an amount of product, sales, or revenue and associating that data with a resource consumption profile. For example, a store producing more product can be expected to use more resources than a similarly situated store producing less product, by comparison. By way of another example, a retail store may consume more resources during a busy shopping season, such as a "Black Friday" type event. Therefore, the operation 410 may include correlating a calendar holiday with a resource consumption. In some embodiments, the operation 410 can include determining and correlating local holidays, customs, working patterns with the telemetry data, which can vary day-to-day, week-by-week, month-by-month, or year-to-year, for example.

At 412, the operation includes building a signature library. This operation can include defining the characteristics of the telemetry data such an associated maximum height (e.g., maximum instantaneous resource per time, such as gallons per minute), average height, area under the curve (AUC), cumulative total, duration, frequency (e.g., daily frequency), expected time between occurrences (e.g., an operation is performed at least every 30 days), an expected start and stop time, a building occupancy, a lighting condition, a security system state, site condition, production information, sales information, weather, and the like. Thus, the standard operation procedure is associated (correlated) with the telemetry data and the site events such that a complete picture can be determined describing the resource consumption of a piece of equipment at a site. In some embodiments, a signature can be generated for each piece of equipment located at a site. In some embodiments, a signature can be generated to represent normal or ideal behavior of the equipment. In some embodiments, a signature can be generated to reflect a mechanical and/or an operational waste.

Figure 4B:
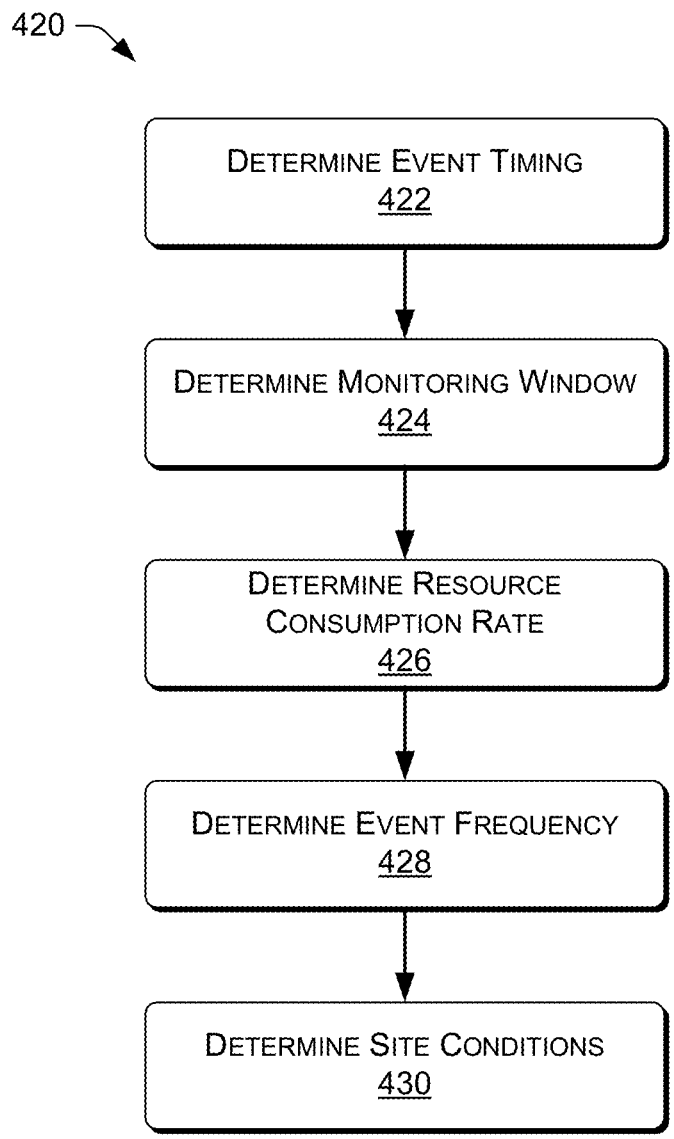
FIG. 4B illustrates another example process for building a signature library.

FIG. 4B illustrates another example process 420 for building a signature library, in accordance with embodiments of the disclosure. By way of example, the process 420 may be used in addition to or instead of the process 400 for building a signature library. By way of example, the process 420 can be performed by the gateway device 202 and/or the service provider 204 in FIG. 2. Generally, the process 420 is performed to link real-world events with telemetry data received from the gateway devices in order to build a resource consumption signature that can be used in other processes to identify one or more resource consumption patterns and to determine when resource consumption is normal or abnormal (e.g., involving mechanical and/or operational waste).

At 422, the operation determines an event timing. For example, an event may occur during business hours, or may occur outside of business hours. As can be understood in the context of this disclosure, the event timing may be defined using any time period, according to the operations associated with a monitoring location (e.g., associated with a standard operating procedure).

At 424, the operation determines a monitoring window. For example, this operation 424 can define a monitoring period in which to detect a suspected event. For example, the monitoring window may be a sliding window in which telemetry data is analyzed, such as a three hour period, a thirty minute period, etc. In some embodiments, the monitoring widow may be determined by a type of mechanical or operational waste expected at the monitoring location, and/or may be determined by an ideal operating condition or procedure of a site equipment.

At 426, the operation determines a resource consumption rate associated with the event timing and the monitoring window, determined in operations 422 and 424, respectively. For example, the operation 426 may determine a resource consumption rate of four gallons per minute (if a water resource is considered) or 1 amp per minute (if an electrical resource is considered). The resource consumption rate may be defined for a minimum time period within the monitoring window, or may be defined by any other metric described herein.

At 428, the operation determines the event frequency. For example, an event may be likely to occur only once per day, or twice per hour, etc. The event frequency may be defined for any time period or interval, and may change or depend on a variety of factors, such as site operating conditions, weather, building occupancy, site productivity, etc.

At 430, the operation determines site conditions. By way of example, and without limitation, the site conditions may include: weather (e.g., temperature, precipitation, amount of sun, etc.), a number of customers, site revenue (e.g., hourly, daily, weekly, etc.), site production (number of products produced per hour, day, week, etc.), and special events (e.g., sales such as "Black Friday" type events, holidays, local traditions, local customs, sporting events, political events, etc.). Thus, the operations 422, 424, 426, 428, and 430 can be performed to formulate a signature in a signature library to determine normal operating conditions and/or may represent a signature of a waste event.

For example, a first non-limiting example of a mechanical waste signature can include: 1) the event occurs during a particular time period, such as off-business hours (e.g., 9:00 PM to 5:00 AM the next day); 2) there can be data available for a particular duration (e.g., a sliding three-hour window); 3) there is a particular resource consumption rate (e.g., 3.0 gallons per minute); and 4) there is likely only one mechanical event per time period.

A second non-limiting example of an operational waste signature can include: 1) the event occurs during a particular time period (or may occur at any time); 2) for a particular time duration, there is present a minimum particular flow (e.g., 3.0 gallons per minute for 420 minutes, 5.0 gallons per minute for 300 minutes, etc.); and 3) for a particular time duration, there may be multiple operational waste events.

A third non-limiting example of a car wash bypass waste signature (i.e., using fresh municipal water instead of recirculating water) can include: 1) the event occurs during a particular time period (or may occur at any time); 2) for a particular time duration, there is present a minimum particular flow (e.g., 40.0 gallons per minute for 30 minutes); and 3) for a particular time duration, there may be multiple operational waste events.

A fourth non-limiting example of a signature is directed to a car wash backwash waste signature. In this example, the car wash backwash can be a normal part of car wash maintenance. However, in some embodiments, there should be no more than three backwashes per day. Thus, the car wash backwash waste signature may include: 1) the event occurs during a particular time period, such as off-business hours (e.g., 9:00 PM to 5:00 AM the next day); 2) there can be data available for a particular duration (e.g., a sliding 15 minute window); 3) there is a particular resource consumption rate (e.g., at least one occurrence of 15 gallons per minute flow and at least five occurrences of 5 gallons per minute flow); and 3) for a particular time duration, there may be multiple operations waste events.

A fifth non-limiting example of a signature may be used to determine purely operational problems that do not involve resource consumption waste. For example, a resource consumption that is abnormally low during a period when normal business operations should be consuming a resource may indicate an operational event, such as an equipment malfunction. In some embodiments, monitoring location conditions may be correlated with a resource consumption rate to determine abnormal or normal operating conditions (e.g., car wash activity may drop if it is raining). Thus, a downtime signature may include: 1) the event occurs during a particular time period, such as normal business hours; 2) there can be data available for a particular duration (e.g., a sliding 30 minute window within normal business hours); 3) there is a particular resource consumption rate (e.g., less than one gallon per minute); 4) there is a particular resource consumption above a particular rate (e.g., the resource consumption returns to a normal condition, such as above 1 gallon per minute); and 5) for a particular time duration, there may be multiple operations waste events.

Figure 5:
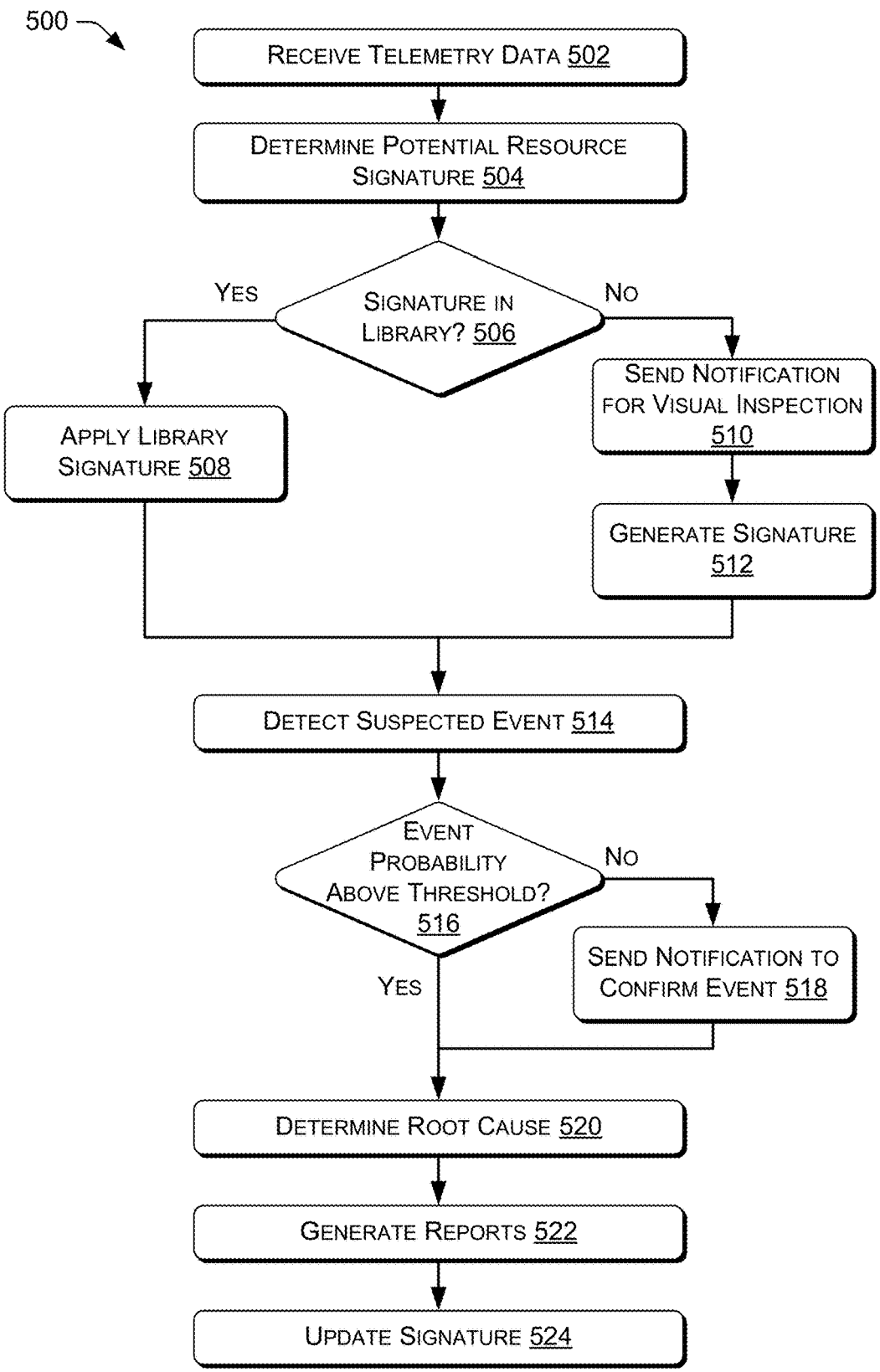
FIG. 5 illustrates an example process for providing resource consumption analytics.

FIG. 5 illustrates an example process 500 for providing resource consumption analytics, in accordance with embodiments of the disclosure. By way of example, the process 500 can be performed by the gateway device 202 and/or the service provider 204 in FIG. 2. In some embodiments, the process 500 may be performed at the computing device 206. Generally, the process 500 is performed to receive telemetry data and site data, analyze the telemetry data and site data, identify mechanical and/or operational waste, and to generate reports and/or alerts indicating normal and/or abnormal operation.

At 502, the operation receives telemetry data. For example, the telemetry data is received at the service provider(s) 204 from the gateway device(s) 202 in FIG. 2. In some embodiments, the telemetry data is received as an XML data stream in real-time or near real-time, indicating the resource consumption of the resource being monitored. In some embodiments, the telemetry data may be received from an FTP (file transfer protocol) site, as an ASCII file, a CSV (comma separated values) file, or in other proprietary formats. In some embodiments, the telemetry data may be received from a remote data store. In some embodiments, the telemetry data can be gathered manually by a worker at a monitoring location and uploaded to a remote data store. Further, this operation can include receiving monitoring location metadata, such as a building occupancy, security state, or other associated telemetry data (e.g., receiving water data and electrical data together and correlating the data). Further, the operation 502 may include receiving site data such as weather, product generation, etc., as described throughout the disclosure.

At 504, the operation determines a potential resource signature. For example, this operation can include determining a start and/or end of a resource signature, or determining a monitoring window. In some embodiments, the operation 504 can identify any resource consumption above a threshold level or a resource consumption pattern as a potential resource signature. In some embodiments, the operation 504 can include removing noise from the potential signature. In some embodiments, this operation includes correlating the potential resource signature with the associated site data.

At 506, the operation determines if the resource signature determined at 504 is in a signature library. In some embodiments, the signature library can include a signature determined using the processes 400 and/or 420, and in some embodiments, the signature library can correspond to the signature library 242 in FIG. 2. In some embodiments, the operation 506 can perform mapping between the potential resource signature determined in 504 and a signature in a signature library to determine a particular flow rate (resource consumption) within a time period, when flow data (resource consumption) occurs. As described in connection with FIGS. 3A and 3B, the resource telemetry data 302 may not correspond exactly with the exemplary resource signature 300. However, the operation 506 can determine that a potential signature (e.g., the resource telemetry data 302) has a similar maximum height and/or similar overall shape to the exemplary resource signature 300. In some embodiments, the signature library may be restricted, filtered, or limited by a type of site category, to a specific customer, or to similarly situated monitoring locations.

Further, the determination in operation 506 can include performing any translation, scaling, and/or manipulations of the potential signature to determine a match with a resource signature stored in the signature library. In some embodiments, the operation 506 can include generating a spectrogram and/or Fourier Transform (such as a Fast Fourier Transform (FFT), Discrete Fourier Transform (DFT), etc.) of the potential signature and matching the spectrogram and/or Fourier Transform with a spectrogram and/or Fourier Transform associated with a signature in the signature library. In some embodiments, a potential signature can be determined to match a signature in the signature library if a match is above a probability threshold. In some embodiments, a potential signature can be determined to match a signature in the signature library by determining an amount of error between the potential signature and the exemplary signature.

At 508, indicating a "YES" that the potential signature is found in the signature library, a library signature (i.e., the exemplary resource signature) is applied to the resource telemetry data. For example, the application can include comparing the measureable aspects of the exemplary signature and the received telemetry data (as associated signature metadata) to determine differences in the maximum height, slopes of resource usage, duration, AUC, operating conditions, etc.

At 510, indicating a "NO" that the potential signature is not found in the signature library, a notification is sent indicating the potential resource signature for visual inspection. In some embodiments, the visual inspection can include an operator reviewing the standard operating procedure of a site or reviewing a site event to determine (e.g., correlate) the potential signature with a real-world event. In some embodiments, a notification may be displayed on a graphical user interface such as that illustrated in FIG. 12, described below.

At 512, the operation generates a signature from the potential signature. In some embodiments, the operation 512 can determine that the potential signature is associated with a signature already present in the library, and can apply an exemplary resource signature to the potential resource signature, instead of or in addition to generating a new signature.

At 514, the operation detects a suspected event. In some embodiments, the operation 514 can determine an absolute or relative difference between one or more characteristics of the potential resource signature and the library signature. For example, in the example provided involving the water conditioner maintenance procedure, a suspected event can be detected in the resource telemetry data 302 by comparing the duration and volume of the resource consumed during the time period of $T_6$-$T_7$ to the duration and volume of the resource consumed during the time period $T_2$-$T_3$. By way of another example, a potential resource signature can be detected in an early morning period before a warehouse is normally open for business. Because resource consumption may not be expected when the warehouse is empty, the operation 514 would determine a suspected event. In some embodiments, the suspected event 514 can include operational waste and/or mechanical waste.

In another example, the operation 514 of determining a suspected event may include determining if the resource signature is an anomaly with respect to similarly situated sites, environmental conditions, and/or other site conditions. For example, the operation 514 may determine a suspected event based on the time of day the event occurs (e.g., during business hours or before/after business hours), start and stop times of the event, the number of occurrences of the event within a time period (e.g., per hour or per day), a magnitude of resource consumption (e.g., gallons per minute of water), and a minimum sustained period of resource consumption (e.g., 30 minutes). In some embodiments, the operation may consider monitoring location metadata such as a building occupancy, security system state, weather (including but not limited to temperature, humidity, wind, and/or indications of sun, rain, lightning, etc.), building lighting states, site production, site customers, site workers, etc. when determining a suspected event. Further, the operation 514 may correlate two or more types of data (e.g., water data and electrical data, water data and temperature, electrical data and site productivity, etc.) to provide greater accuracy in determining the presence of a suspected event.

At 516, the operation determines if an event probability is above a threshold. For example, the event probability can depend on an absolute or relative difference between the telemetry data and the library signature. In some embodiments, the event probability threshold can be set to reduce a possibility of false positives for detecting a suspected event. In some embodiments, the event probability threshold can be set based on a number of successful predictions based on applying the library signature to a potential resource signature and accurately detecting an event. When an event probability is above the event probability threshold ("YES"), the process 500 can be considered to be operating in an "Automatic" or "Auto" mode.

At 518, indicating a "NO" that the event probability is below the threshold, a notification is sent to confirm the suspected event. For example, the standard operating procedure and/or site events can be reviewed to determine if the suspected event comports with the SOP or the site event. In some embodiments, the suspected event can be reviewed in light of historical data of suspected events and outcomes to increase the accuracy of the prediction. When an event probability is below the event probability threshold, the process 500 can be considered to be operating in a "Triage" mode. In some embodiments, a notification may be displayed on a graphical user interface such as that illustrated in FIG. 12, described below. If a suspected event is confirmed in the operation 518, the process continues to operation 520.

At 520, indicating a "YES" that the event probability is above the event probability threshold, the root cause of a suspected event is determined. In some embodiments, a root cause can be an operational waste and/or a mechanical waste. In some embodiments, the library signature can be associated with a root cause of the suspected event (e.g., faucet left on after work hours). In some embodiments, the operation 520 determines the most likely causes of the suspected events, based on the size of an error, the potential signature, and the library signature. In some embodiments, the operation 520 can include generating recommendations to review equipment on site, and/or can include contacting a designated individual or a service provider, such as a maintenance worker or facility.

At 522, the operation generates one or more reports. In some embodiments, the reports generated can correspond to one or more reports and/or GUIs illustrated in FIGS. 6-15. For example, the reports can include the potential resource signature, the library signature, identification of a suspected event, annotations, explanations, recommendations, equipment lists, site maps, historical comparisons, site conditions, and the like.

At 524, the operation updates a signature, such as the signature determined to be in the signature library in operation 506 or generated in operation 512. For example, the process 500 can incorporate real-time or near real-time telemetry data or site data into the signatures such that the signatures are updated dynamically as the operation and usage of the equipment changes. In some embodiments, the signatures can be updated to improve a matching or prediction of the suspected event.

Exemplary graphical user interfaces illustrating one or more alerts, signatures, reports, recommendations, analysis, and/or historical data are shown in FIGS. 6-15. As can be understood in the context of this disclosure, the service providers 204 can analyze data received from the gateway device 202, generate alerts, signatures, reports, and or GUIs, and transmit the alerts, signatures, reports, and/or GUIs to the computing device 206 for display as a GUI. In some embodiments, the GUIs described herein can be provided in an email, web-portal, or other user interface in the GUIs 246 and/or 256 of FIG. 2.

Figure 6:
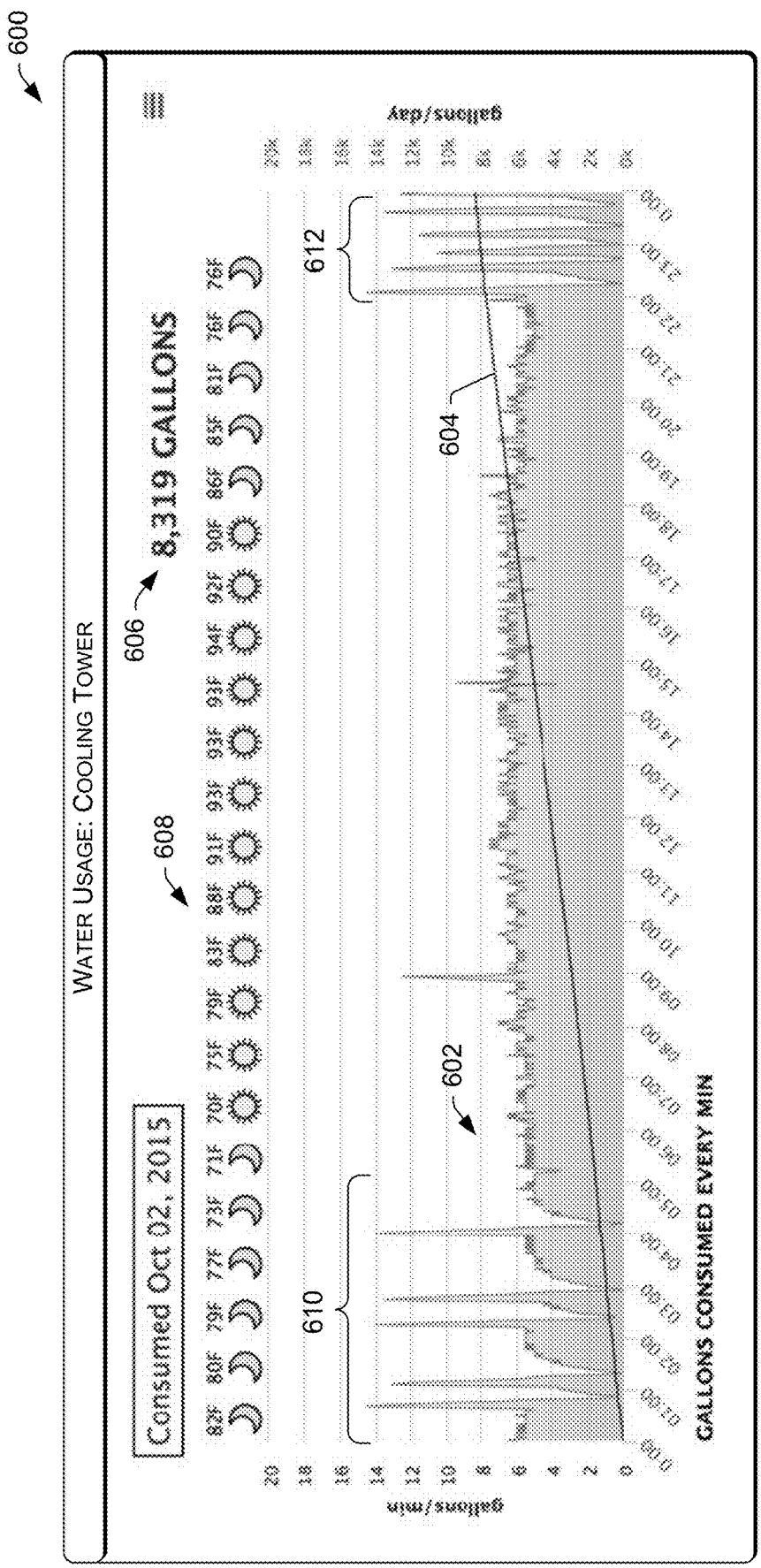
FIG. 6 shows a graphical user interface (GUI) illustrating water usage for a cooling tower location.

FIG. 6 shows a graphical user interface (GUI) 600 illustrating water usage for a cooling tower location. In some embodiments, the GUI 600 illustrates a water usage signature that can be used in generating historical data, and/or for suspected event detection. For example, the GUI 600 illustrates a resource consumption signature 602 over a 24 hour period. The resource monitored is water, and the resource consumption is illustrated on the left axis as gallons per min.

A cumulative total is tracked and illustrated as the line 604, with the cumulative total axis illustrated on the right axis as gallons per day. The total resource 606 is displayed as 8,319 gallons, illustrating the total number of gallons used throughout the day. Also provided are hourly weather icons 608, illustrating the weather present at the site associated with the resource consumption signature 602. Displaying the hourly weather icons 608 (including but not limited to temperature, humidity, wind, and/or indications of sun, rain, clouds, lightning, etc.) along with the resource consumption signature 602 gives context to the use of the cooling towers vis-à-vis the weather. A section 610 is provided between midnight and approximately 5:00 AM, illustrating a cyclic consumption pattern associated with a cooling tower ramping up, spiking, and shutting down due to inappropriate control settings under the demand conditions, while a section 612 is provided between approximately 10:00 PM and midnight, illustrating the cyclic consumption pattern.

Figure 7A:
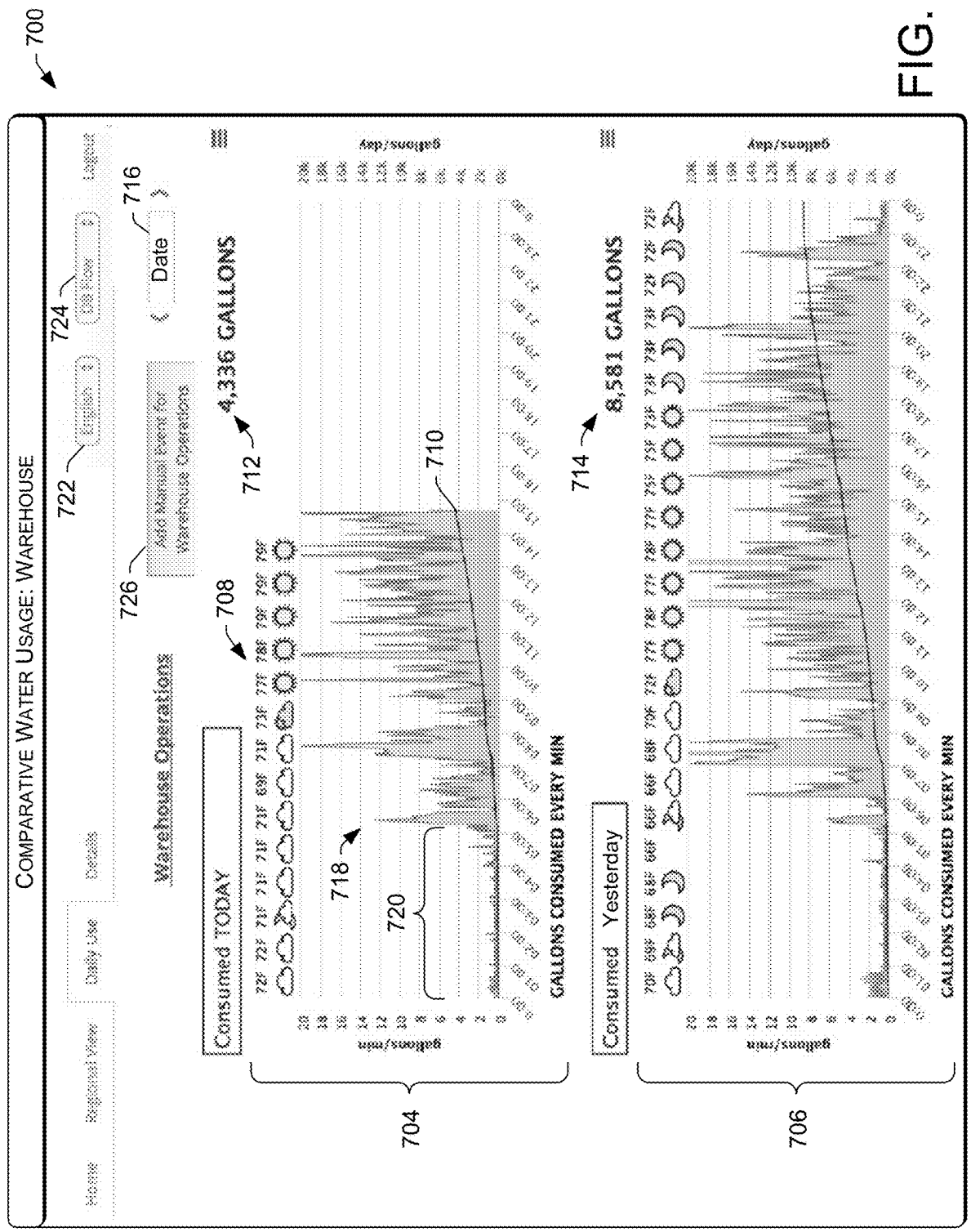
FIGS. 7A and 7B show graphical user interfaces illustrating water usage for a warehouse location.
Figure 7B:
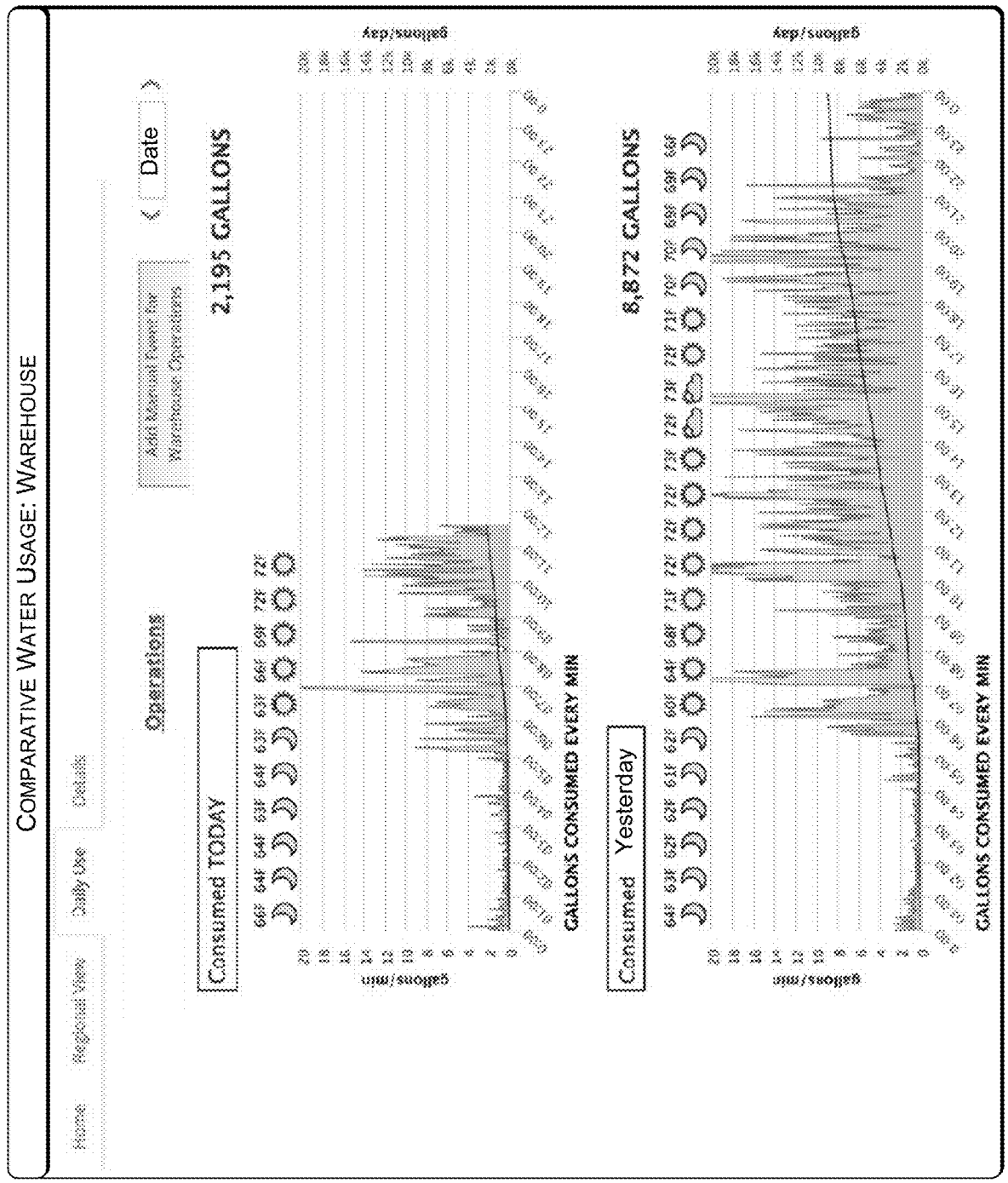

FIGS. 7A and 7B show graphical user interfaces (GUIs) 700 and 702, respectively, illustrating water usage for a warehouse location. In some embodiments, the GUIs 700 and 702 illustrate historical water usage and instantaneous water usage as a number of gallons consumed every minute. For example, a graph 704 provides the instantaneous water usage of the warehouse location on the current day, while a graph 706 provides the water usage of the warehouse location from a previous day (e.g., yesterday). In some embodiments, the GUIs 700 and 702 illustrate an hourly weather and temperature (e.g., as icons 708), as well as a cumulative total (e.g., line 710) of water usage throughout the day. In some embodiments, a current total (e.g., element 712) and a daily total (e.g., element 714) can be displayed in the GUIs 700 and/or 702. In some embodiments, a user can toggle through various days (e.g., using date selector 716) to compare a current water usage with any historical data at a same and/or different location. When the date selector 716 is selected the GUI can be updated with a graph 704 to reflect the selected date. Returning to the graph 702, also illustrated is a resource signature 718, with a corresponding section 720, corresponding approximately to midnight to 5:00 AM.

Further, the GUI 700 can include a language selector 722, a DB Flow selector 724, and a selector 726 to add a manual event for warehouse operations. In some embodiments, the DB Flow selector 724 can toggle the data view between a first flow as recorded upon arrival at the database and a second flow as recorded with the specific time stamp the instant the water passed through the meter. That is to say, the DB Flow selector 724 can change a resolution or granularity of the resource consumption data to aid in identifying mechanical and/or operational waste. In some embodiments, the selector 726 can allow an operator to manually identify a resource signature, or tag some or all of the resource signature 718 for further review. Further, the GUI 700 can allow a user to change a scale of data presented (e.g., from gallons per minute to liters per hour, or the like). The GUI 700 can also display a dynamic information tool allowing a user to select any data point and receive additional information, such as placing a cursor on the trend line graph 704 to receive an accumulated volume, time, site conditions, etc.

Figure 8:
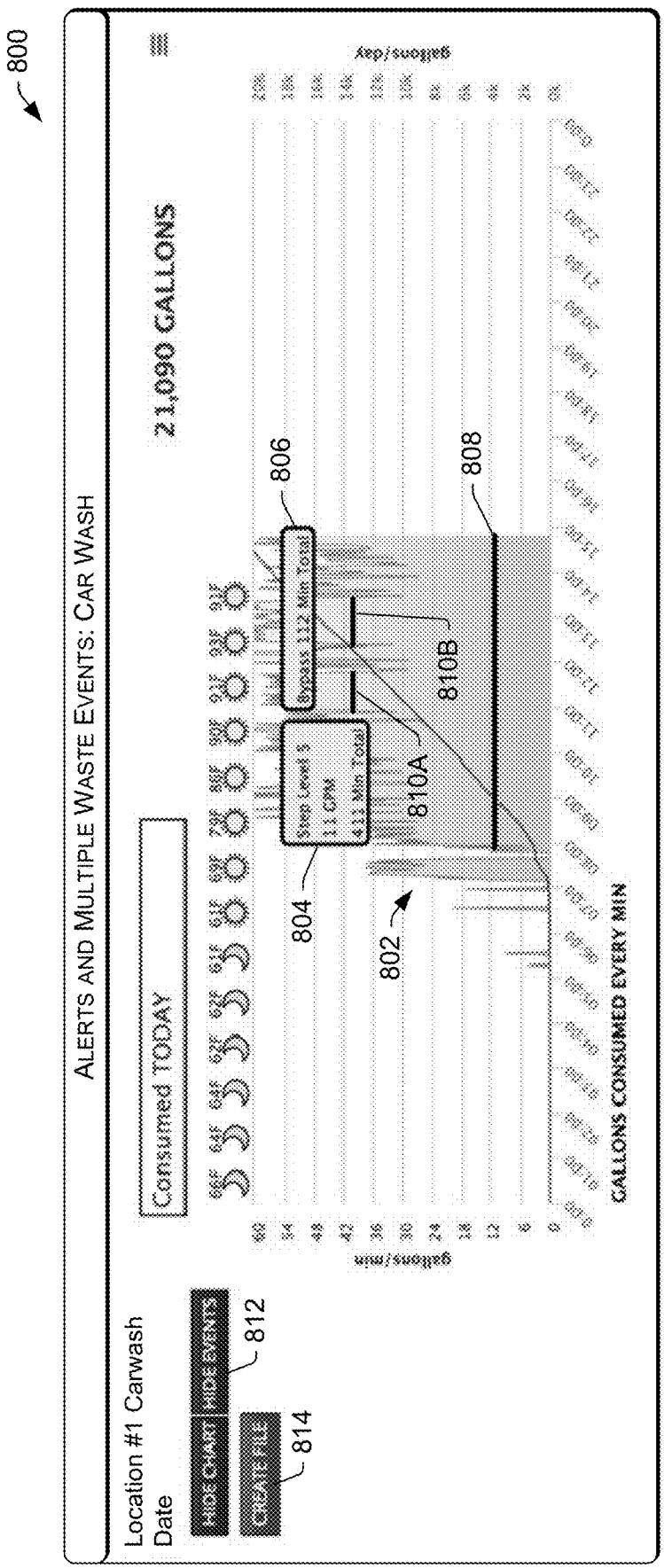
FIG. 8 shows a GUI illustrating multiple waste events occurring at a same time.

FIG. 8 shows a graphical user interface (GUI) 800 illustrating multiple waste events occurring at a same time. In some embodiments, the GUI 800 illustrates the water usage 802 at a car wash. In some embodiments, the GUI 800 includes annotations 804 and 806 providing analysis and/or notes identifying the associated waste event. Each annotation can include one or more additional annotations to distinguish the one or more identified waste water events. For example, the annotation 804 identifies a waste event "Step Level 5" of magnitude of 11 gallons per minute (GPM) for 411 minutes total, providing a categorization of the waste event according to a level (e.g., levels 1, 2, 3, 4, or 5). The element 808 is associated with the annotation 804 to illustrate the duration and location of the suspected event within the resource consumption data. The annotation 806 identifies a waste event "Bypass 112 Min Total," indicating that the car wash site bypassed the components used to recycle the dirty water of the car wash (using fresh municipal water instead), causing the car wash to use excessive amounts of water. The elements 810A and 810B can be associated with the annotation 806 to illustrate the duration and location of the suspected events within the resource consumption data. Further, the GUI 800 can include one or more toggle buttons, such as button 812 to hide the annotations on the graph, or button 814 which allows the data to be exported to another file, for example, as an extensible markup language (XML) file, a comma separated values (CSV) file, an Excel® file, or any other format or file, as is understood in the context of this disclosure.

Figure 9:
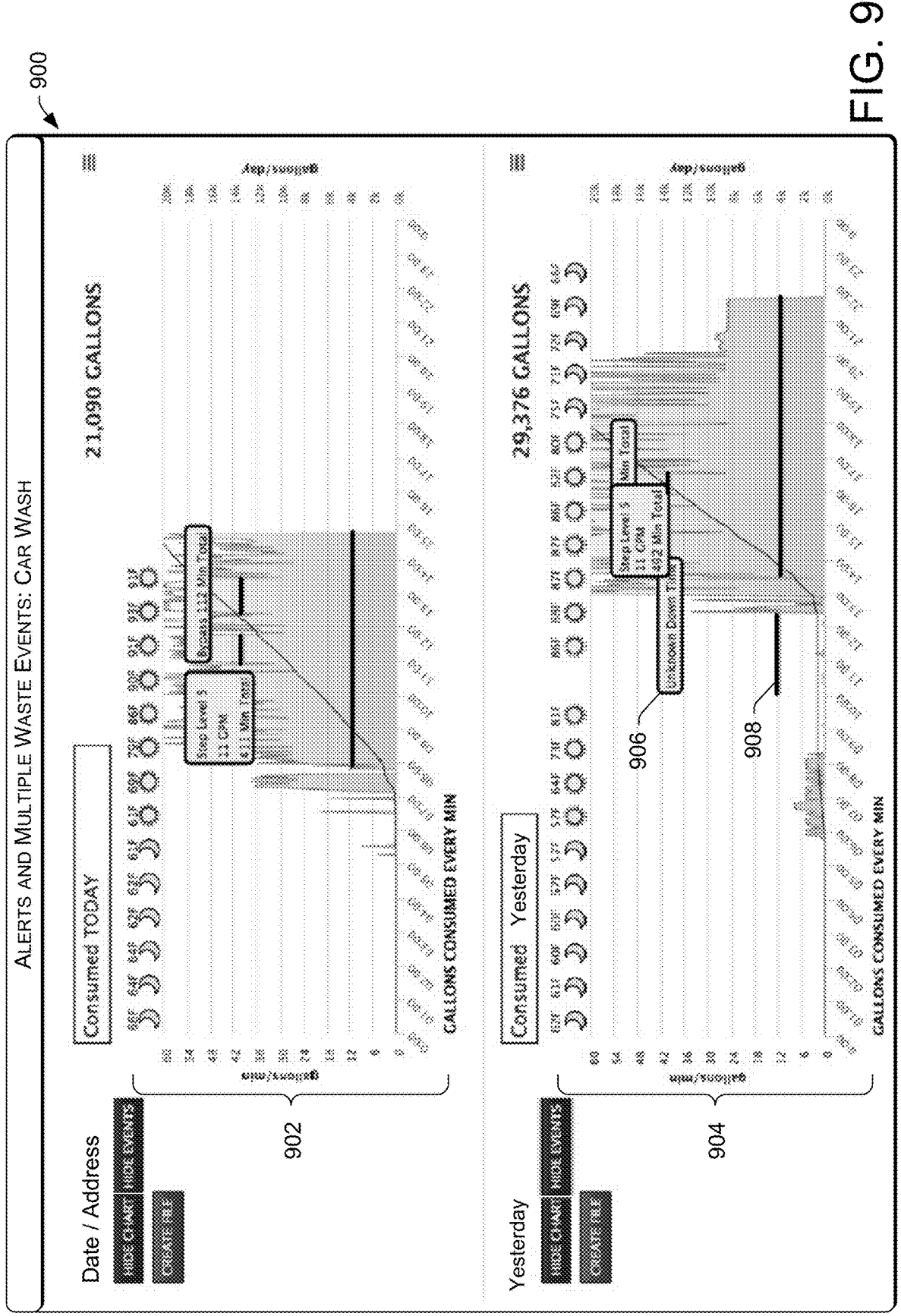
FIG. 9 shows a GUI illustrating comparative water usage for a car wash location.

FIG. 9 shows a graphical user interface (GUI) 900 illustrating comparative water usage for a car wash location. In some embodiments, the GUI 900 illustrates resource consumption graphics with analytics-generated annotations. In some embodiments, the annotations can be added manually, automatically, or can be flagged by an automated process and reviewed by a user. GUI 900 allows for a comparison between a current usage represented in graph 902 and a historical usage, represented in graph 904. It can be understood in the context of this disclosure that a user can select and display data for any date of the same and/or different locations. Further, it can be understood that the graph 902 illustrates a similar graph as shown in the GUI 800. Turning to the graph 904, this includes an annotation 906 indicating an "Unknown Down Time." Further, annotation 908 is associated with the annotation 906 and can illustrate the duration associated with the unknown downtime. In general, an "Unknown Down Time" event can indicate that the site data (e.g., a day of the week, weather (e.g., temperature, the presence or absence of sun or rain)), whether a current time is a holiday or not, etc.) suggests that the monitoring location should have a resource use but none is measured. In some embodiments, the suspected event annotated by the annotation 906 can correspond to the car wash being offline during hours the car wash is normally in business. Thus, the present disclosure provides additional benefits of indirectly providing a business monitoring tool by monitoring the consumption of resources, for example.

FIG. 10 shows a graphical user interface (GUI) 1000 illustrating regional water usage for a plurality of locations. In some embodiments, the GUI 1000 illustrates a comparison for the current day's water usage (e.g., graphic 1002) and the previous day's water usage (e.g., graphic 1004). In both of the graphics 1002 and 1004, the filled-in elements represent an amount of resources used. In some embodiments, the GUI 1000 includes a high-level indication of whether an event (or a suspected event) has been detected at a particular location. For example, the indications 1006, 1008, and 1010 each refer to a total amount of gallons of water used at a particular location, represented as 8,580 gallons, 62 gallons, and 13,725 gallons, respectively. Additionally, each of the indicators 1006, 1008, and 1010 is associated with varying levels of gray, indicating the presence of a suspected event. For example, the indicator 1008 is shown without a color to indicate that data is missing.

Based upon the location and the operations associated with the operations, this can indicate a sensor error, a business error, or some other problem. The indicator 1006 is shown with a light gray color to indicate that no suspected event was detected. The indicator 1010 is shown with a dark gray color to indicate that a suspected event was detected. In some embodiments, the suspected event associated with the indicator 1010 (e.g., Location #4) can indicate that the car wash site bypassed the components used to recycle the dirty water of the car wash, causing the car wash to use excessive amounts of water. Further, the graphics associated with Location #4 illustrate the large volume of water used at all time periods of the current day and the previous day. In some embodiments, the GUI 1000 can be sent to all locations shown in the GUI 1000, such as managers and/or executives associated with the particular locations, any can be provided with any frequency (e.g., daily, weekly, quarterly) and at any time of the day. Accordingly, the GUI 1000 can encourage competition between locations, and/or can alert management to an outlying location that can need additional assistance to reduce waste.

In some embodiments, the locations in the GUI 1000 can be ranked or ordered in any manner, for example, by revenue generated, number of customers, amount of resources used, etc. It may be understood in the context of this disclosure that the GUI 1000 may include any site metadata described herein, such as a revenue, temperature, occupancy, product output, etc., to provide more context to the resource usage as it relates to the overall performance of the monitoring location.

Figure 11:
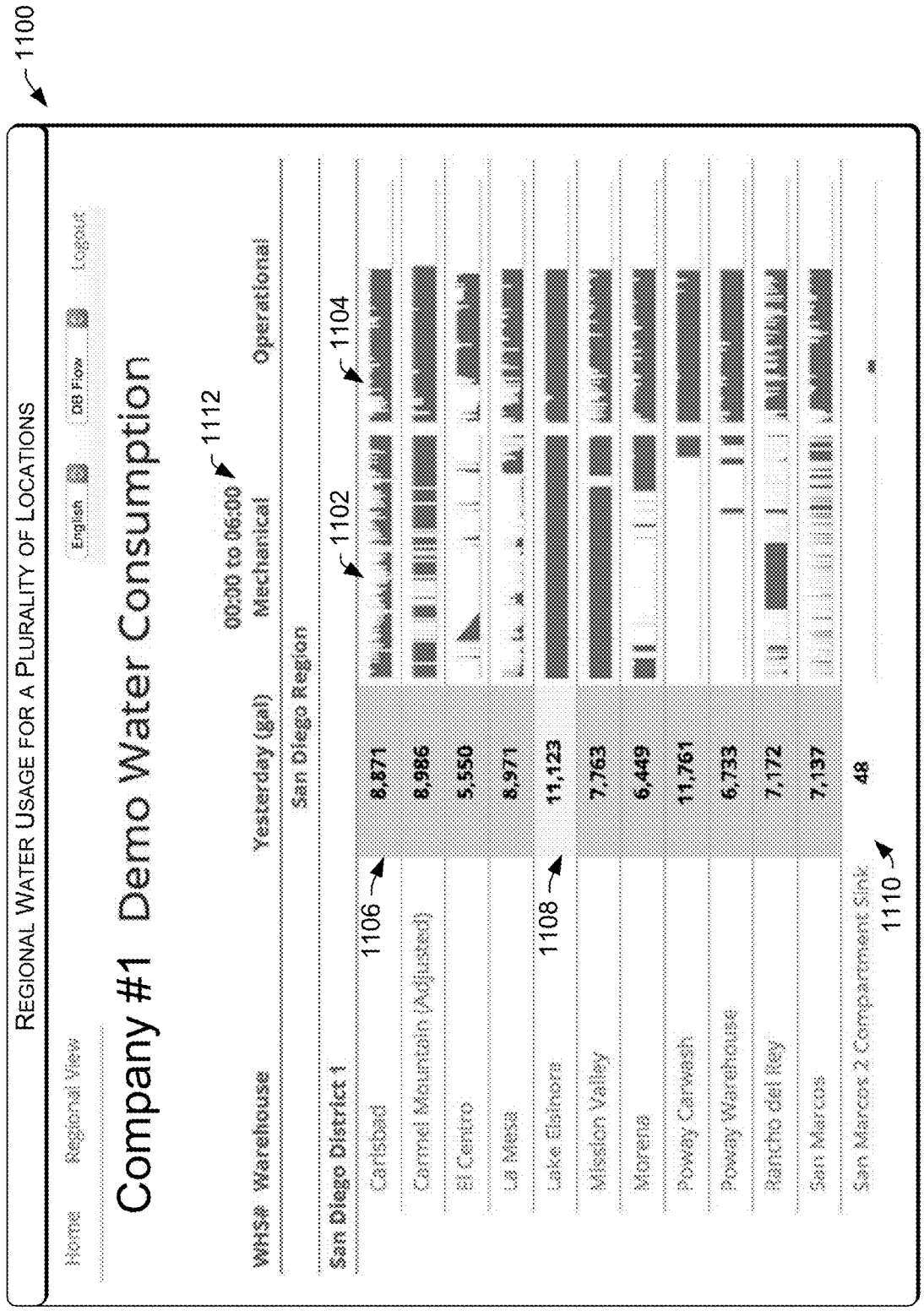
FIG. 11 shows a GUI illustrating a regional reporting page.

FIG. 11 shows a graphical user interface (GUI) 1100 illustrating a regional reporting page. In some embodiments, the GUI 1100 illustrates a regional report for executives and/or managers. In some embodiments, the GUI 1100 illustrates mechanical waste (e.g., as graphic 1102) and/or operational waste (e.g., as graphic 1104) for each particular location, as well as a high-level indication of the status of the particular location (e.g., indicators 1106, 1108, and 1110). In some embodiments, the graphics 1102 and 1104 illustrate the amount of each waste type, respectively, throughout the time period 1112 indicated in the GUI 1100, with the more area filled in representing more waste at the approximate time (e.g., laid out from left to right in the graphics 1102 and 1104, respectively). As can be understood in the context of this disclosure, any date and/or time period can be selected via the GUI 1100, causing the GUI to dynamically update the information displayed. In this manner, the GUIs described herein, and the GUI 1100, provide a personalized user interface illustrating data types and ranges specified by and relevant to a user. Similar to the indicators in FIG. 10, the indicators 1106, 1108, and 1110 can be associated with a color or other visual indicator to provide high-level information of an alert. For example, the medium gray color for the indicator 1106 can indicate a normal operation, the white (or uncolored) indicator 1110 can indicate a lack of data, while a light gray indicator 1108 can indicate a suspected event. Thus, the GUI 1100 provides a simple overview of a plurality of locations that allows a view to have a deep understanding of the resource profiles of each location.

As can be understood in the context of this disclosure, any element of the GUI 1100 (and in any of the GUIs discussed herein) can be selected in order to obtain more specific information associated with each element. For example, selecting the indicator 1106 can provide a link to a detailed GUI, such as GUI 700, containing information specific to a monitoring location.

FIG. 12 shows a graphical user interface (GUI) 1200 illustrating a waste event message generator for a plurality of locations. In some embodiments, the GUI 1200 illustrates a high-level indication for each particular location, as well as how the event is to be handled (e.g., "Manual," "Triage," or "Auto"). In some embodiments, the GUI 1200 may include a notification that a signature can be visually inspected, or that a suspect event can be confirmed, as described above in connection with FIG. 5. In some embodiments, the "Manual" indicator 1202 indicates that signatures can be made by visual inspection or that signatures can be made manually to build a signature library. In some embodiments, the "Triage" indicator 1204 indicates that the resource signatures can be identified but a suspected event can be confirmed before issuing an alert. In some embodiments, and "Auto" indicator 1206 indicates that signatures can be identified automatically and an alert can be sent out without any confirmation or intervention. In some embodiments, the action "GO" indicators 1208 can be selected for each location, respectively, to issue a waste message, such as those illustrated in FIGS. 13 and 14, discussed below.

Figure 13:
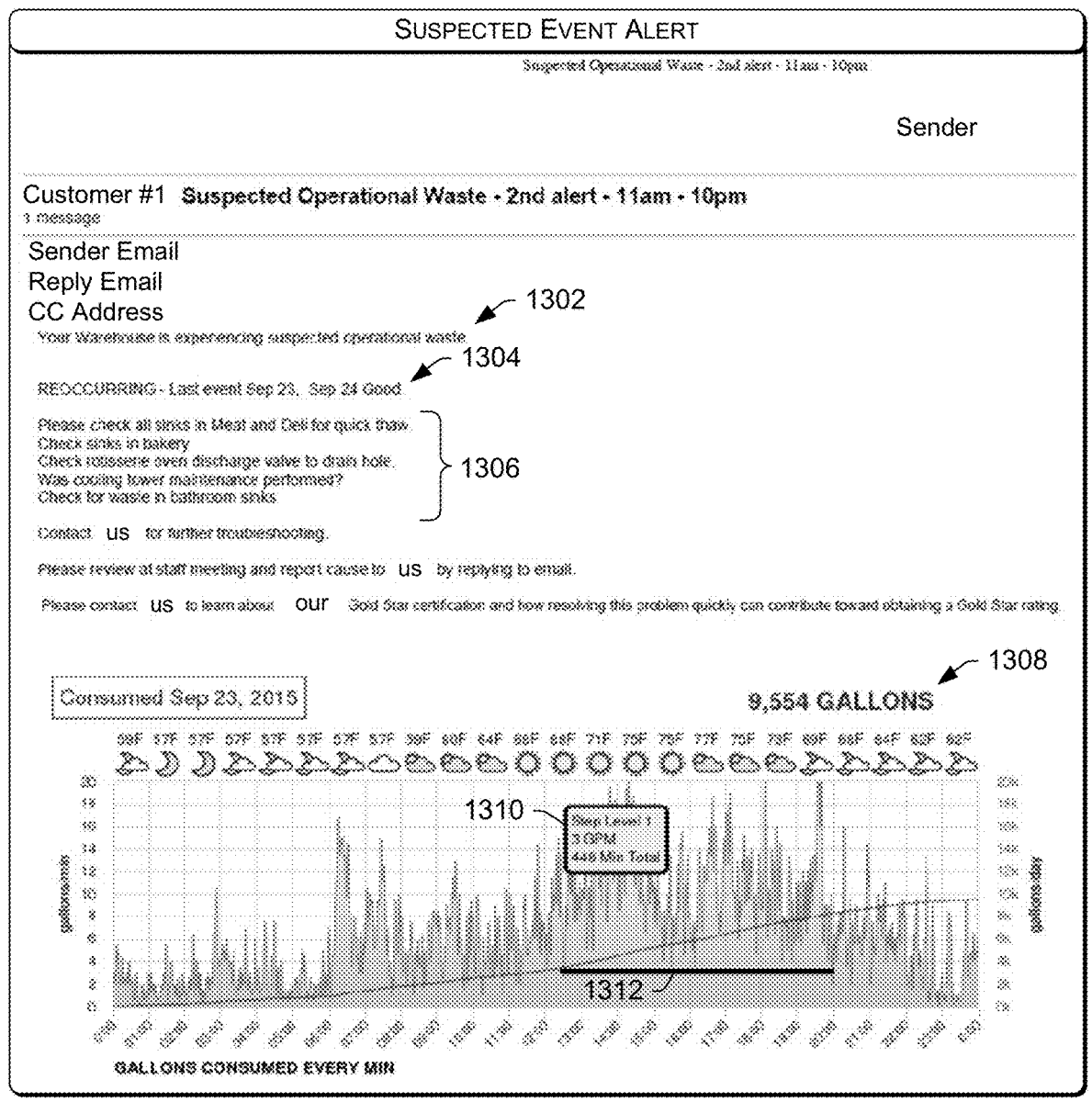
FIG. 13 shows a GUI illustrating a suspected event report and/or alert.

FIG. 13 shows a graphical user interface (GUI) 1300 illustrating a suspected event report and/or alert. In some embodiments, the GUI 1300 illustrates an email indicating a suspected operational waste alert. In some embodiments, the alert/report can include various levels of information, varying in detail and levels of specificity. First, a general description 1302 of the suspected event can be provided. Second, the type of suspected event can be indicated (e.g., in description 1304), which can identify any previous history of suspected events. Third, the email can include one or more recommendations or actionable items 1306 for a manager, executive, and/or worker to implement. Fourth, a graphic 1308 can illustrate a resource consumption profile, and can include one or more annotations 1310 and 1312 identifying and explaining the scope of the suspected event. For example, any relevant GUI discussed herein can be provided in an alert to identify and/or explain the suspected event. As can be understood in the context of this disclosure, the GUI 1300 including the suspected event report and/or alert can include any variations of explanations, recommendations, graphics, or the like, and is not to be limited by the examples provided herein. For example, reports and GUIs can be provided comparing the resource consumption between a plurality of locations and revenue associated with each location, or reports and GUIs can be provided to provide evidence that a mechanical or operational waste was reduced. As can be understood in the context of this disclosure, reports and/or alerts can be conveyed in any manner, including but not limited to a text message, web-portal, email, website, push notification, pull notification, specific applications ("apps"), or the like.

Figure 14:
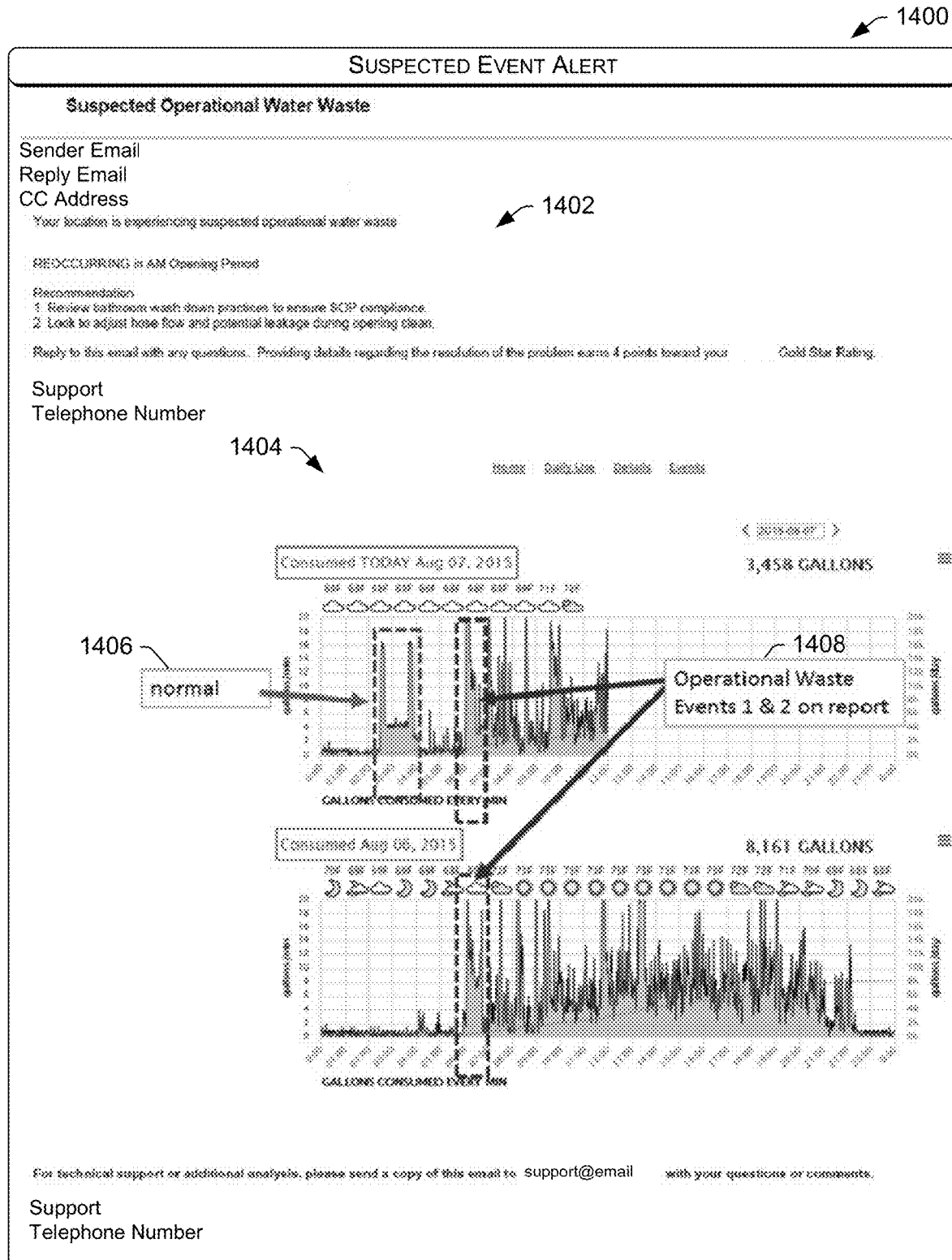
FIG. 14 shows a GUI illustrating a reporting email for a suspected reoccurring event.

FIG. 14 shows a graphical user interface (GUI) 1400 illustrating a reporting email for a suspected reoccurring event. In some embodiments, the GUI 1400 identifies when a suspected event is occurring and provides a recommendation 1402 to remedy the suspected event. Further, the GUI 1400 can include one or more graphs 1404 including one or more annotations 1406 and 1408 providing analysis and/or evidentiary support for the suspected event. As can be understood in the context of this disclosure, the resource profile identified by the annotation 1406 can correspond to the exemplary resource signature 300 illustrated in FIG. 3A.

Figure 15:
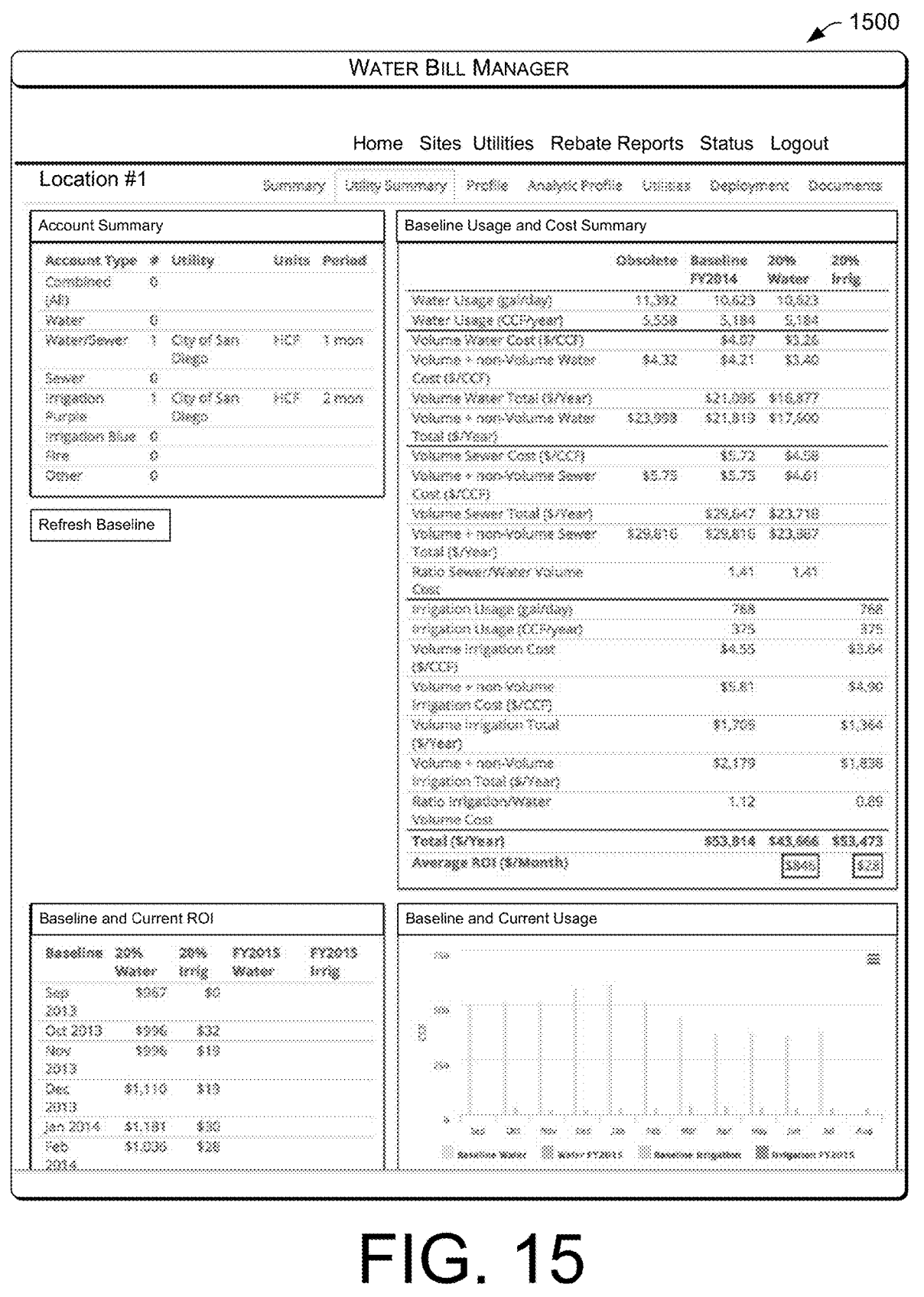

FIG. 15 shows a graphical user interface (GUI) 1500 illustrating a water bill manager for a monitoring location. In some embodiments, the GUI 1500 illustrates a monetary amount that a user can save if they implement one or more aspects of the systems and techniques described herein. In some embodiments, the GUI 1500 illustrates the baseline and current water usage at a user location. In some embodiments, the analytics associated with GUI 1500 can incorporate one or more rate tiers, tax brackets, incentives, etc., to determine a return-on-investment (ROI) associated with implementing one or more aspects of this disclosure.

CONCLUSION

Although the present disclosure can use language that is specific to structural features and/or methodological acts, the invention is not limited to the specific features or acts described herein. For example, some features may have been discussed in connection with an individual GUI, although it can be understood in the context of this disclosure that the various features described herein may be added, omitted, combined, or applied in any manner. The specific features and acts are disclosed as illustrative forms of implementing the invention.

What is claimed is:

1. A method for providing a graphical user interface including at least one resource consumption analytics, the method comprising:
   accessing, from one or more non-transitory memory devices, executable instructions that, when executed, perform operations comprising:
   accessing first resource consumption data indicating a first consumption of a first water resource over a period of time, the first resource consumption data received from a first gateway device at a first monitoring location;
   accessing second resource consumption data indicating a second consumption of a second water resource over the period of time, the second resource consumption data received from a second gateway device at a second monitoring location;
   accessing, from the one or more non-transitory memory devices, a first site-specific information corresponding to at least one of:
     sales data corresponding to the period of time;
     production data corresponding to the period of time; or
     shipping data corresponding to the period of time;
   associating the first resource consumption data with the first site-specific information, and associating the second resource consumption data with a second site-specific information;
   associating the first resource consumption data with the second resource consumption data over the period of time;
   presenting, in the graphical user interface rendered on a display, a first graphic including the first resource consumption data over the period of time and a second graphic including the second resource consumption data over the period of time; and
   presenting, in the graphical user interface rendered on the display, a visual element indicating an occurrence of a suspected event indicating a misuse of the first water resource at the first monitoring location.

2. The method of claim 1, further comprising presenting, in the graphical user interface, an indication of a mechanical waste associated with the first monitoring location and an operational waste associated with the first monitoring location, wherein the mechanical waste comprises a first misuse of the first water resource resulting from a failure of a mechanism at the first monitoring location, and wherein the operational waste comprises a second misuse of the first water resource resulting from an incorrect application of a standard operation procedure for operating the mechanism at the first monitoring location.

3. The method of claim 1, further comprising presenting, in the graphical user interface, a first indication of a first total resource consumption of the first water resource over the period of time and a second indication of a second total resource consumption of the second water resource over the period of time.

4. The method of claim 1, further comprising providing the graphical user interface to a computing device as a daily report.

5. The method of claim 1, further comprising providing at least one link in the graphical user interface to a resource consumption page specific to the first monitoring location.

6. A system for monitoring a water resource and for providing at least one graphical user interface, the system comprising:
   one or more processors; and
   one or more memory devices storing computer-readable instructions that, when executed by the one or more processors, cause the system to perform operations comprising:
   accessing first resource consumption data indicating a first consumption of a first water resource over a period of time, the first resource consumption data received from a first gateway device at a first monitoring location;
   accessing second resource consumption data indicating a second consumption of a second water resource over the period of time, the second resource consumption data received from a second gateway device at a second monitoring location;
   associating the first resource consumption data and the second resource consumption data over the period of time;
   determining that the first resource consumption data includes an indication of a suspected event associated with a misuse of the first water resource at the first monitoring location by:
     determining that the first resource consumption data is associated with an amount of production of a product;
     determining that the second resource consumption data is associated with the amount of production of the product; and
     determining that the first consumption of the first water resource comprises a greater consumption than the second consumption of the second water resource;
   associating the suspected event with an operational waste category;
   presenting, in the at least one graphical user interface, a first graphic including the first resource consumption data over the period of time and a second graphic including the second resource consumption data over the period of time;
   presenting, in the at least one graphical user interface, a visual element indicating the suspected event and whether the suspected event is associated with a mechanical waste category or the operational waste category; and
   presenting, in the at least one graphical user interface and to a human operator, a text or an image providing an instruction associated with mitigating the suspected event.

7. The system of claim 6 wherein the operational waste category comprises a misuse of the first water resource resulting from an incorrect application of a standard operation procedure for operating a mechanism at the first monitoring location.

8. The system of claim 6, wherein the operations further comprise presenting, in the at least one graphical user interface, a first indication of a first total resource consumption of the first water resource over the period of time and a second indication of a second total resource consumption of the second water resource over the period of time.

9. The system of claim 6, wherein the operations further comprise providing the at least one graphical user interface to a computing device as a daily report.

10. The system of claim 6, wherein the operations further comprise providing at least one link in the at least one graphical user interface to a resource consumption page specific to the first monitoring location.

11. The system of claim 6, wherein the first resource consumption data is associated with a first timestamp and the second resource consumption data is associated with a second timestamp that indicates a different day than the first timestamp.

* * * * *